US011516755B2

(12) United States Patent  
Sridharan et al.

(10) Patent No.: US 11,516,755 B2
(45) Date of Patent: Nov. 29, 2022

(54) SIGNALING AND CONFIGURATION OF MAXIMUM TRANSMIT POWER USING VIRTUAL PORTS

(71) Applicant: QUALCOMM Incorporated, San Diego, CA (US)

(72) Inventors: Gokul Sridharan, Sunnyvale, CA (US); Yi Huang, San Diego, CA (US); Wei Yang, San Diego, CA (US); Wanshi Chen, San Diego, CA (US); Peter Gaal, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 184 days.

(21) Appl. No.: 16/990,376

(22) Filed: Aug. 11, 2020

(65) Prior Publication Data

US 2021/0051608 A1 Feb. 18, 2021

Related U.S. Application Data

(60) Provisional application No. 62/888,169, filed on Aug. 16, 2019.

(51) Int. Cl.
*H04W 52/36* (2009.01)
*H04W 8/24* (2009.01)
(Continued)

(52) U.S. Cl.
CPC ...... *H04W 52/367* (2013.01); *G06F 9/45558* (2013.01); *H04L 1/1614* (2013.01);
(Continued)

(58) Field of Classification Search
CPC ... H04W 8/24; H04W 52/146; H04W 52/265; H04W 52/367; G06F 9/45558;
(Continued)

(56) References Cited

U.S. PATENT DOCUMENTS 9,326,258 B2  4/2016  Takaoka et al.
9,787,387 B2  10/2017  Moon et al.
(Continued)

FOREIGN PATENT DOCUMENTS

WO    2020167747 A1    8/2020

OTHER PUBLICATIONS

International Search Report and Written Opinion—PCT/US2020/045902—ISA/EPO—dated Oct. 30, 2020.
(Continued)

*Primary Examiner* — Hoon J Chung
(74) *Attorney, Agent, or Firm* — Qualcomm Incorporated

(57) ABSTRACT

Various aspects of the present disclosure generally relate to wireless communication. In some aspects, a user equipment (UE) may transmit, to a base station, an indication of whether the UE is capable of using a virtual port to transmit uplink communications using a maximum transmit power according to a power class of the UE, wherein the virtual port is a combination of two or more antenna ports. The UE may receive, from the base station, a sounding reference signal configuration based at least in part on the indication. Numerous other aspects are provided.

40 Claims, 14 Drawing Sheets

(51) Int. Cl.
    *H04L 25/02* (2006.01)
    *H04L 1/16* (2006.01)
    *G06F 9/455* (2018.01)
    *H04L 5/00* (2006.01)

(52) U.S. Cl.
    CPC ........ *H04L 5/0051* (2013.01); *H04L 25/0226* (2013.01); *H04W 8/24* (2013.01); *G06F 2009/45595* (2013.01)

(58) Field of Classification Search
    CPC ......... G06F 2009/45595; H04L 1/1614; H04L 5/0048; H04L 5/0051; H04L 25/0226; H04L 27/261; H04B 7/0617; H04B 7/0671; H04B 7/0465; H04B 7/0404; H04B 7/0639
    See application file for complete search history.

(56) References Cited

U.S. PATENT DOCUMENTS

| | | | |
|---|---|---|---|
| 10,749,584 | B2 | 8/2020 | Rahman et al. |
| 10,958,321 | B2 | 3/2021 | Park et al. |
| 2019/0124600 | A1 | 4/2019 | Papasakellariou et al. |
| 2019/0327691 | A1 | 10/2019 | Zhang et al. |
| 2019/0327693 | A1* | 10/2019 | Rahman .............. H04W 52/146 |
| 2020/0162133 | A1 | 5/2020 | Harrison et al. |
| 2020/0187128 | A1 | 6/2020 | Yao et al. |
| 2020/0205093 | A1* | 6/2020 | Kim .................... H04W 52/242 |
| 2021/0219129 | A1* | 7/2021 | Liu ...................... H04B 17/102 |
| 2021/0359733 | A1 | 11/2021 | Harrison et al. |

OTHER PUBLICATIONS

LG Electronics: Discussions on Full Tx Power Uplink Transmission, 3GPP Draft, 3GPP TSG RAN WG1 #97, R1-1906732, Full Pow UL TX, 3rd Generation Partnership Project (3GPP), Mobile Competence Centre, 650, Route Des Lucioles, F-06921, Sophia-Antipolis Cedex, France, vol. RAN WG1, No. Reno, USA; May 13, 2019-May 17, 2019, May 13, 2019 (May 13, 2019), XP051728183, 5 pages, Retrieved from the Internet: URL: http://www.3gpp.org/ftp/Meetings%5F3GPP%5FSYNC/RAN1/DOCS/R1%2D1906732%2Ezip [retrieved on May 13, 2019] Section 2.1.

Samsung: "View on Full Power UL Transmission", 3GPP Draft, 3GPP TSG RAN WG1 meeting #97, R1-1906970, UL Full Power TX, 3rd Generation Partnership Project (3GPP), Mobile Competence Centre, 650, Route Des Lucioles, F-06921, Sophia-Antipolis Cedex, France, vol. RAN WG1, No. Reno, USA, May 13, 2019-May 17, 2019, May 13, 2019 (May 13, 2019), XP051728419, 10 pages, Retrieved from the Internet: URL: http://www.3gpp.org/ftp/Meetings%5F3GPP%5FSYNC/RAN1/Docs/R1%2D1906970%2Ezip [retrieved on May 13, 2019] p. 2 Section 4.

VIVO: "Outcome or online Discussion on Full TX Power UL Transmission," 3GPP Draft, 3GPP TSG RAN WG1#96, R1-1903445 Outcome of Offline Discussion on Full TX Power UL Transmission, 3rd Generation Partnership Project (3GPP), Mobile Competence Centre, 650, Route Des Lucioles, F-06921, Sophia-Antipolis Cedex, France, vol. RAN WG1, No. Athens, Greece; Feb. 25, 2019-Mar. 1, 2019, Feb. 27, 2019 (Feb. 27, 2019), XP051601116, 3 pages, Retrieved from the Internet: URL: https://www.3gpp.org/ftp/tsg_ran/WG1_RL1/TSGR1_96/Docs/R1-1903445.zip [retrieved on May 13, 2019] p. 1.

* cited by examiner

SIGNALING AND CONFIGURATION OF MAXIMUM TRANSMIT POWER USING VIRTUAL PORTS

CROSS-REFERENCE TO RELATED APPLICATION

This Patent Application claims priority to U.S. Provisional Patent Application No. 62/888,169, filed on Aug. 16, 2019, entitled "SIGNALING AND CONFIGURATION OF MAXIMUM TRANSMIT POWER USING VIRTUAL PORTS," and assigned to the assignee hereof. The disclosure of the prior Application is considered part of and is incorporated by reference in this Patent Application.

FIELD OF THE DISCLOSURE

Aspects of the present disclosure generally relate to wireless communication and to techniques and apparatuses for signaling and configuration of maximum transmit power using virtual ports.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power, and/or the like). Examples of such multiple-access technologies include code division multiple access (CDMA) systems, time division multiple access (TDMA) systems, frequency-division multiple access (FDMA) systems, orthogonal frequency-division multiple access (OFDMA) systems, single-carrier frequency-division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

A wireless communication network may include a number of base stations (BSs) that can support communication for a number of user equipment (UEs). A user equipment (UE) may communicate with a base station (BS) via the downlink and uplink. The downlink (or forward link) refers to the communication link from the BS to the UE, and the uplink (or reverse link) refers to the communication link from the UE to the BS. As will be described in more detail herein, a BS may be referred to as a Node B, a gNB, an access point (AP), a radio head, a transmit receive point (TRP), a New Radio (NR) BS, a 5G Node B, and/or the like.

The above multiple access technologies have been adopted in various telecommunication standards to provide a common protocol that enables different user equipment to communicate on a municipal, national, regional, and even global level. New Radio (NR), which may also be referred to as 5G, is a set of enhancements to the LTE mobile standard promulgated by the Third Generation Partnership Project (3GPP). NR is designed to better support mobile broadband Internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink (DL), using CP-OFDM and/or SC-FDM (e.g., also known as discrete Fourier transform spread OFDM (DFT-s-OFDM)) on the uplink (UL), as well as supporting beamforming, multiple-input multiple-output (MIMO) antenna technology, and carrier aggregation. However, as the demand for mobile broadband access continues to increase, there exists a need for further improvements in LTE and NR technologies. Preferably, these improvements should be applicable to other multiple access technologies and the telecommunication standards that employ these technologies.

SUMMARY

In some aspects, a method of wireless communication, performed by a user equipment (UE), may include transmitting, to a base station, an indication of whether the UE is capable of using a virtual port to transmit uplink communications using a maximum transmit power according to a power class of the UE, wherein the virtual port is a combination of two or more antenna ports; and receiving, from the base station, a sounding reference signal configuration based at least in part on the indication.

In some aspects, a method of wireless communication, performed by a UE, may include transmitting, to a base station, a bitmap that indicates a set of transmit precoding matrix indicators (TPMIs) that support a maximum transmit power for uplink communications according to a power class of the UE, wherein at least one TPMI, of the set of TPMIs that support the maximum transmit power, is not represented by any individual bit of the bitmap; and transmitting an uplink communication using a first TPMI included in the set of TPMIs and using a power allocation procedure associated with transmissions that use the first TPMI.

In some aspects, a method of wireless communication, performed by a base station, may include receiving, from a UE, an indication of whether the UE is capable of using a virtual port to transmit uplink communications using a maximum transmit power according to a power class of the UE, wherein the virtual port is a combination of two or more antenna ports; and transmitting, to the UE, a sounding reference signal configuration based at least in part on the indication.

In some aspects, a method of wireless communication, performed by a base station, may include receiving, from a UE, a bitmap that indicates a set of TPMIs that support a maximum transmit power for uplink communications according to a power class of the UE, wherein at least one TPMI, of the set of TPMIs that support the maximum transmit power, is not represented by any individual bit of the bitmap; and transmitting, to the UE, an instruction to transmit using the maximum transmit power and a TPMI included in the set of TPMIs.

In some aspects, a UE for wireless communication may include memory and one or more processors operatively coupled to the memory. The memory and the one or more processors may be configured to transmit, to a base station, an indication of whether the UE is capable of using a virtual port to transmit uplink communications using a maximum transmit power according to a power class of the UE, wherein the virtual port is a combination of two or more antenna ports; and receive, from the base station, a sounding reference signal configuration based at least in part on the indication.

In some aspects, a UE for wireless communication may include memory and one or more processors operatively coupled to the memory. The memory and the one or more processors may be configured to transmit, to a base station, a bitmap that indicates a set of TPMIs that support a maximum transmit power for uplink communications according to a power class of the UE, wherein at least one TPMI, of the set of TPMIs that support the maximum transmit power, is not represented by any individual bit of the bitmap; and transmit an uplink communication using a first TPMI included in the set of TPMIs and using a power allocation procedure associated with transmissions that use the first TPMI.

In some aspects, a base station for wireless communication may include memory and one or more processors operatively coupled to the memory. The memory and the one or more processors may be configured to receive, from a UE, an indication of whether the UE is capable of using a virtual port to transmit uplink communications using a maximum transmit power according to a power class of the UE, wherein the virtual port is a combination of two or more antenna ports; and transmit, to the UE, a sounding reference signal configuration based at least in part on the indication.

In some aspects, a base station for wireless communication may include memory and one or more processors operatively coupled to the memory. The memory and the one or more processors may be configured to receive, from a UE, a bitmap that indicates a set of TPMIs that support a maximum transmit power for uplink communications according to a power class of the UE, wherein at least one TPMI, of the set of TPMIs that support the maximum transmit power, is not represented by any individual bit of the bitmap; and transmit, to the UE, an instruction to transmit using the maximum transmit power and a TPMI included in the set of TPMIs.

In some aspects, a non-transitory computer-readable medium may store one or more instructions for wireless communication. The one or more instructions, when executed by one or more processors of a UE, may cause the one or more processors to: transmit, to a base station, an indication of whether the UE is capable of using a virtual port to transmit uplink communications using a maximum transmit power according to a power class of the UE, wherein the virtual port is a combination of two or more antenna ports; and receive, from the base station, a sounding reference signal configuration based at least in part on the indication.

In some aspects, a non-transitory computer-readable medium may store one or more instructions for wireless communication. The one or more instructions, when executed by one or more processors of a UE, may cause the one or more processors to: transmit, to a base station, a bitmap that indicates a set of TPMIs that support a maximum transmit power for uplink communications according to a power class of the UE, wherein at least one TPMI, of the set of TPMIs that support the maximum transmit power, is not represented by any individual bit of the bitmap; and transmit an uplink communication using a first TPMI included in the set of TPMIs and using a power allocation procedure associated with transmissions that use the first TPMI.

In some aspects, a non-transitory computer-readable medium may store one or more instructions for wireless communication. The one or more instructions, when executed by one or more processors of a base station, may cause the one or more processors to: receive, from a UE, an indication of whether the UE is capable of using a virtual port to transmit uplink communications using a maximum transmit power according to a power class of the UE, wherein the virtual port is a combination of two or more antenna ports; and transmit, to the UE, a sounding reference signal configuration based at least in part on the indication.

In some aspects, a non-transitory computer-readable medium may store one or more instructions for wireless communication. The one or more instructions, when executed by one or more processors of a base station, may cause the one or more processors to: receive, from a UE, a bitmap that indicates a set of TPMIs that support a maximum transmit power for uplink communications according to a power class of the UE, wherein at least one TPMI, of the set of TPMIs that support the maximum transmit power, is not represented by any individual bit of the bitmap; and transmit, to the UE, an instruction to transmit using the maximum transmit power and a TPMI included in the set of TPMIs.

In some aspects, an apparatus for wireless communication may include means for transmitting, to a base station, an indication of whether the apparatus is capable of using a virtual port to transmit uplink communications using a maximum transmit power according to a power class of the apparatus, wherein the virtual port is a combination of two or more antenna ports; and means for receiving, from the base station, a sounding reference signal configuration based at least in part on the indication.

In some aspects, an apparatus for wireless communication may include means for transmitting, to a base station, a bitmap that indicates a set of TPMIs that support a maximum transmit power for uplink communications according to a power class of the apparatus, wherein at least one TPMI, of the set of TPMIs that support the maximum transmit power, is not represented by any individual bit of the bitmap; and means for transmitting an uplink communication using a first TPMI included in the set of TPMIs and using a power allocation procedure associated with transmissions that use the first TPMI.

In some aspects, an apparatus for wireless communication may include means for receiving, from a UE, an indication of whether the UE is capable of using a virtual port to transmit uplink communications using a maximum transmit power according to a power class of the UE, wherein the virtual port is a combination of two or more antenna ports; and means for transmitting, to the UE, a sounding reference signal configuration based at least in part on the indication.

In some aspects, an apparatus for wireless communication may include means for receiving, from a UE, a bitmap that indicates a set of TPMIs that support a maximum transmit power for uplink communications according to a power class of the UE, wherein at least one TPMI, of the set of TPMIs that support the maximum transmit power, is not represented by any individual bit of the bitmap; and means for transmitting, to the UE, an instruction to transmit using the maximum transmit power and a TPMI included in the set of TPMIs.

Aspects generally include a method, apparatus, system, computer program product, non-transitory computer-readable medium, user equipment, base station, wireless communication device, and/or processing system as substantially described herein with reference to and as illustrated by the accompanying drawings and specification.

The foregoing has outlined rather broadly the features and technical advantages of examples according to the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects. The same reference numbers in different drawings may identify the same or similar elements.

DETAILED DESCRIPTION

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, algorithms, and/or the like (collectively referred to as "elements"). These elements may be implemented using hardware, software, or combinations thereof. Whether such elements are implemented as hardware or software depends upon the particular application and design constraints imposed on the overall system.

It should be noted that while aspects may be described herein using terminology commonly associated with 3G and/or 4G wireless technologies, aspects of the present disclosure can be applied in other generation-based communication systems, such as 5G and later, including NR technologies.

Figure 1:
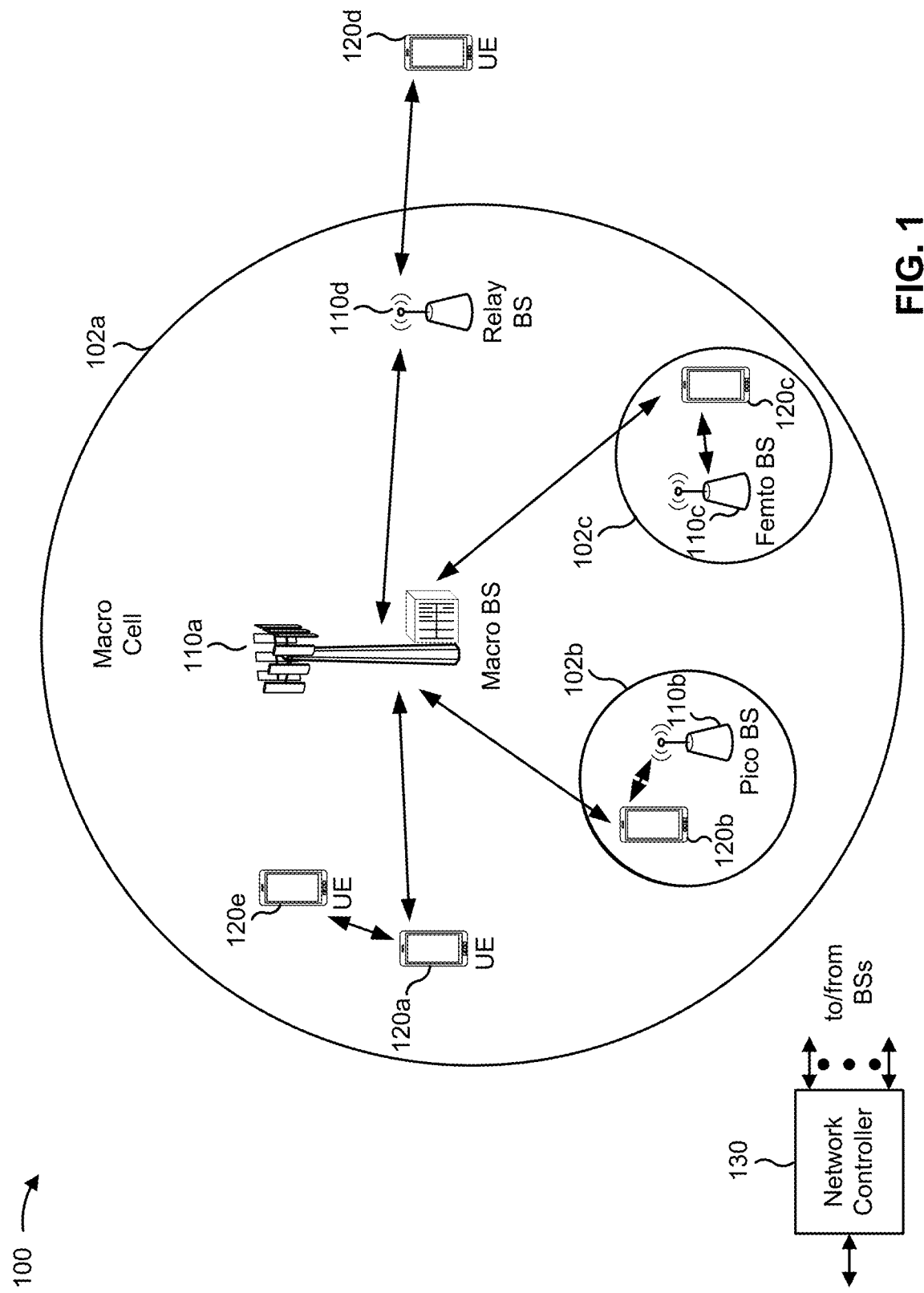
FIG. 1 is a block diagram illustrating an example of a wireless communication network, in accordance with various aspects of the present disclosure.

FIG. 1 is a diagram illustrating a wireless network 100 in which aspects of the present disclosure may be practiced. The wireless network 100 may be an LTE network or some other wireless network, such as a 5G or NR network. The wireless network 100 may include a number of BSs 110 (shown as BS 110a, BS 110b, BS 110c, and BS 110d) and other network entities. ABS is an entity that communicates with user equipment (UEs) and may also be referred to as a base station, a NR BS, a Node B, a gNB, a 5G node B (NB), an access point, a transmit receive point (TRP), and/or the like. Each BS may provide communication coverage for a particular geographic area. In 3GPP, the term "cell" can refer to a coverage area of a BS and/or a BS subsystem serving this coverage area, depending on the context in which the term is used.

A BS may provide communication coverage for a macro cell, a pico cell, a femto cell, and/or another type of cell. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having association with the femto cell (e.g., UEs in a closed subscriber group (CSG)). ABS for a macro cell may be referred to as a macro BS. A BS for a pico cell may be referred to as a pico BS. A BS for a femto cell may be referred to as a femto BS or a home BS. In the example shown in FIG. 1, a BS 110a may be a macro BS for a macro cell 102a, a BS 110b may be a pico BS for a pico cell 102b, and a BS 110c may be a femto BS for a femto cell 102c. A BS may support one or multiple (e.g., three) cells. The terms "eNB", "base station", "NR BS", "gNB", "TRP", "AP", "node B", "5G NB", and "cell" may be used interchangeably herein.

In some aspects, a cell may not necessarily be stationary, and the geographic area of the cell may move according to the location of a mobile BS. In some aspects, the BSs may be interconnected to one another and/or to one or more other BSs or network nodes (not shown) in the wireless network 100 through various types of backhaul interfaces such as a direct physical connection, a virtual network, and/or the like using any suitable transport network.

Wireless network 100 may also include relay stations. A relay station is an entity that can receive a transmission of data from an upstream station (e.g., a BS or a UE) and send a transmission of the data to a downstream station (e.g., a UE or a BS). A relay station may also be a UE that can relay transmissions for other UEs. In the example shown in FIG. 1, a relay BS 110d may communicate with macro BS 110a and a UE 120d in order to facilitate communication between BS 110a and UE 120d. A relay BS may also be referred to as a relay station, a relay base station, a relay, and/or the like.

Wireless network 100 may be a heterogeneous network that includes BSs of different types, e.g., macro BSs, pico BSs, femto BSs, relay BSs, and/or the like. These different types of BSs may have different transmit power levels, different coverage areas, and different impacts on interference in wireless network 100. For example, macro BSs may have a high transmit power level (e.g., 5 to 40 Watts) whereas pico BSs, femto BSs, and relay BSs may have lower transmit power levels (e.g., 0.1 to 2 Watts).

A network controller 130 may couple to a set of BSs and may provide coordination and control for these BSs. Network controller 130 may communicate with the BSs via a backhaul. The BSs may also communicate with one another, e.g., directly or indirectly via a wireless or wireline backhaul.

UEs 120 (e.g., 120a, 120b, 120c) may be dispersed throughout wireless network 100, and each UE may be stationary or mobile. A UE may also be referred to as an access terminal, a terminal, a mobile station, a subscriber unit, a station, and/or the like. A UE may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device or equipment, biometric sensors/devices, wearable devices (smart watches, smart clothing, smart glasses, smart wrist bands, smart jewelry (e.g., smart ring, smart bracelet)), an entertainment device (e.g., a music or video device, or a satellite radio), a vehicular component or sensor, smart meters/sensors, industrial manufacturing equipment, a global positioning system device, or any other suitable device that is configured to communicate via a wireless or wired medium.

Some UEs may be considered machine-type communication (MTC) or evolved or enhanced machine-type communication (eMTC) UEs. MTC and eMTC UEs include, for example, robots, drones, remote devices, sensors, meters, monitors, location tags, and/or the like, that may communicate with a base station, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, and/or may be implemented as NB-IoT (narrowband internet of things) devices. Some UEs may be considered a Customer Premises Equipment (CPE). UE 120 may be included inside a housing that houses components of UE 120, such as processor components, memory components, and/or the like.

In general, any number of wireless networks may be deployed in a given geographic area. Each wireless network may support a particular RAT and may operate on one or more frequencies. A RAT may also be referred to as a radio technology, an air interface, and/or the like. A frequency may also be referred to as a carrier, a frequency channel, and/or the like. Each frequency may support a single RAT in a given geographic area in order to avoid interference between wireless networks of different RATs. In some cases, NR or 5G RAT networks may be deployed.

In some aspects, two or more UEs 120 (e.g., shown as UE 120a and UE 120e) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, and/or the like), a mesh network, and/or the like. In this case, the UE 120 may perform scheduling operations, resource selection operations, and/or other operations described elsewhere herein as being performed by the base station 110.

As indicated above, FIG. 1 is provided as an example. Other examples may differ from what is described with regard to FIG. 1.

Figure 2:
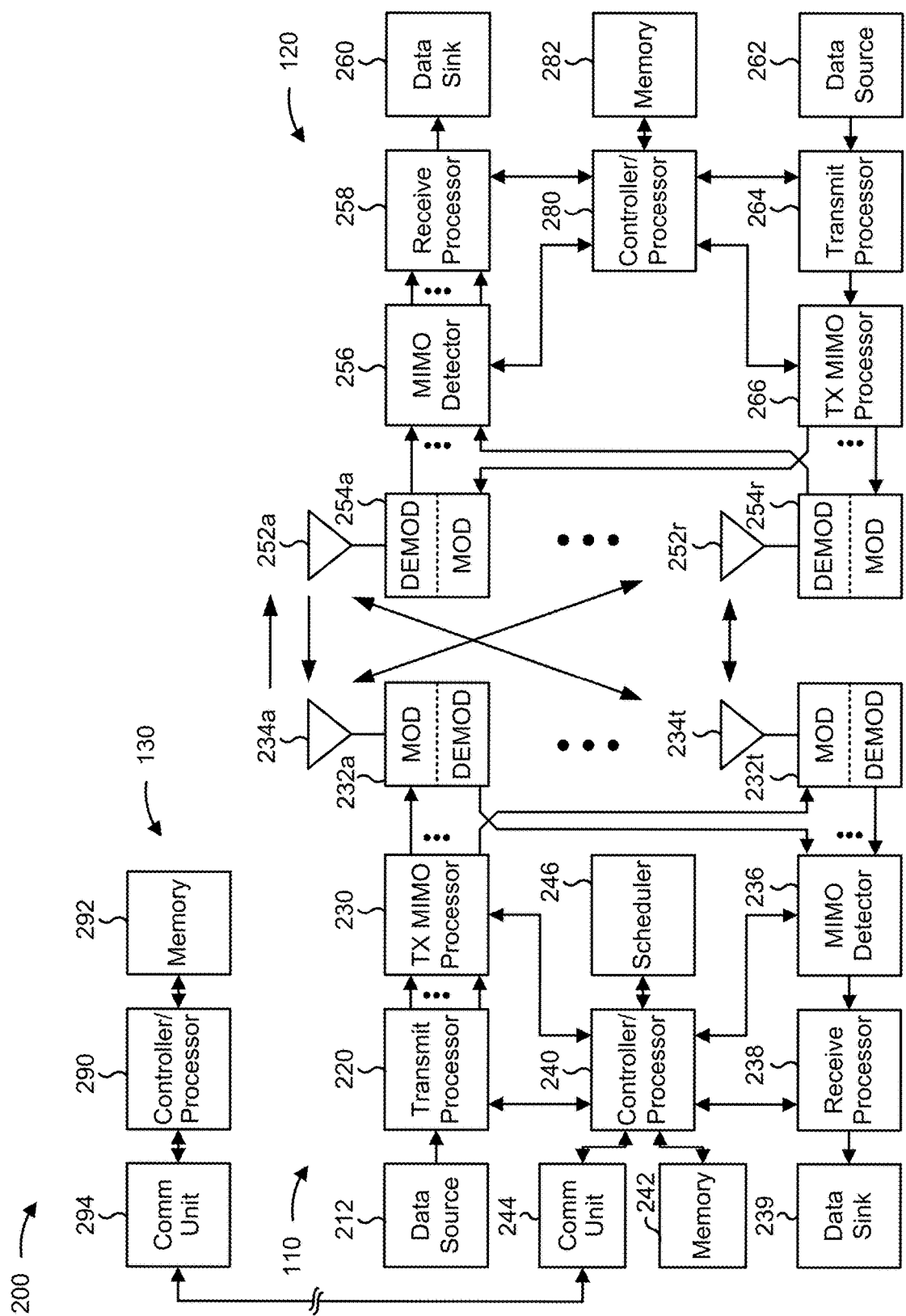
FIG. 2 is a block diagram illustrating an example of a base station in communication with a UE in a wireless communication network, in accordance with various aspects of the present disclosure.

FIG. 2 shows a block diagram of a design 200 of base station 110 and UE 120, which may be one of the base stations and one of the UEs in FIG. 1. Base station 110 may be equipped with T antennas 234a through 234t, and UE 120 may be equipped with R antennas 252a through 252r, where in general T≥1 and R≥1.

At base station 110, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232a through 232t. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232a through 232t may be transmitted via T antennas 234a through 234t, respectively. According to various aspects described in more detail below, the synchronization signals can be generated with location encoding to convey additional information.

At UE 120, antennas 252a through 252r may receive the downlink signals from base station 110 and/or other base stations and may provide received signals to demodulators (DEMODs) 254a through 254r, respectively. Each demodulator 254 may condition (e.g., filter, amplify, downconvert, and digitize) a received signal to obtain input samples. Each demodulator 254 may further process the input samples (e.g., for OFDM and/or the like) to obtain received symbols.

A MIMO detector 256 may obtain received symbols from all R demodulators 254a through 254r, perform MIMO detection on the received symbols if applicable, and provide detected symbols. A receive processor 258 may process (e.g., demodulate and decode) the detected symbols, provide decoded data for UE 120 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 120 may be included in a housing.

On the uplink, at UE 120, a transmit processor 264 may receive and process data from a data source 262 and control information (e.g., for reports comprising RSRP, RSSI, RSRQ, CQI, and/or the like) from controller/processor 280. Transmit processor 264 may also generate reference symbols for one or more reference signals. The symbols from transmit processor 264 may be precoded by a TX MIMO processor 266 if applicable, further processed by modulators 254a through 254r (e.g., for DFT-s-OFDM, CP-OFDM, and/or the like), and transmitted to base station 110. At base station 110, the uplink signals from UE 120 and other UEs may be received by antennas 234, processed by demodulators 232, detected by a MIMO detector 236 if applicable, and further processed by a receive processor 238 to obtain decoded data and control information sent by UE 120. Receive processor 238 may provide the decoded data to a data sink 239 and the decoded control information to controller/processor 240. Base station 110 may include communication unit 244 and communicate to network controller 130 via communication unit 244. Network controller 130 may include communication unit 294, controller/processor 290, and memory 292.

Controller/processor 240 of base station 110, controller/processor 280 of UE 120, and/or any other component(s) of FIG. 2 may perform one or more techniques associated with signaling and configuration of maximum transmit power using virtual ports, as described in more detail elsewhere herein. For example, controller/processor 240 of base station 110, controller/processor 280 of UE 120, and/or any other component(s) of FIG. 2 may perform or direct operations of, for example, process 1100 of FIG. 11, process 1200 of FIG. 12, process 1300 of FIG. 13, process 1400 of FIG. 14, and/or other processes as described herein. Memories 242 and 282 may store data and program codes for base station 110 and UE 120, respectively. In some aspects, memory 242 and/or memory 282 may comprise a non-transitory computer-readable medium storing one or more instructions for wireless communication. For example, the one or more instructions, when executed by one or more processors of the base station 110 and/or the UE 120, may perform or direct operations of, for example, process 1100 of FIG. 11, process 1200 of FIG. 12, process 1300 of FIG. 13, process 1400 of FIG. 14, and/or other processes as described herein. A scheduler 246 may schedule UEs for data transmission on the downlink and/or uplink.

In some aspects, UE 120 may include means for transmitting, to a base station, an indication of whether the UE 120 is capable of using a virtual port to transmit uplink communications using a maximum transmit power according to a power class of the UE 120, wherein the virtual port is a combination of two or more antenna ports; means for receiving, from the base station, a sounding reference signal configuration based at least in part on the indication; and/or the like. Additionally, or alternatively, UE 120 may include means for transmitting, to a base station, a bitmap that indicates a set of TPMIs that support a maximum transmit power for uplink communications according to a power class of the UE 120, wherein at least one TPMI, of the set of TPMIs that support the maximum transmit power, is not represented by any individual bit of the bitmap; means for transmitting an uplink communication using a first TPMI included in the set of TPMIs and using a power allocation procedure associated with transmissions that use the first TPMI; and/or the like. In some aspects, such means may include one or more components of UE 120 described in connection with FIG. 2, such as controller/processor 280, transmit processor 264, TX MIMO processor 266, MOD 254, antenna 252, DEMOD 254, MIMO detector 256, receive processor 258, and/or the like. Virtual ports and TPMIs are described in more detail below in connection with FIG. 3.

In some aspects, base station 110 may include means for receiving, from a UE, an indication of whether the UE is capable of using a virtual port to transmit uplink communications using a maximum transmit power according to a power class of the UE, wherein the virtual port is a combination of two or more antenna ports; means for transmitting, to the UE, a sounding reference signal configuration based at least in part on the indication; and/or the like. Additionally, or alternatively, base station 110 may include means for receiving, from a UE, a bitmap that indicates a set of TPMIs that support a maximum transmit power for uplink communications according to a power class of the UE, wherein at least one TPMI, of the set of TPMIs that support the maximum transmit power, is not represented by any individual bit of the bitmap; means for transmitting, to the UE, an instruction to transmit using the maximum transmit power and a TPMI included in the set of TPMIs; and/or the like. In some aspects, such means may include one or more components of base station 110 described in connection with FIG. 2, such as antenna 234, DEMOD 232, MIMO detector 236, receive processor 238, controller/processor 240, transmit processor 220, TX MIMO processor 230, MOD 232, antenna 234, and/or the like.

As indicated above, FIG. 2 is provided as an example. Other examples may differ from what is described with regard to FIG. 2.

Figure 3:
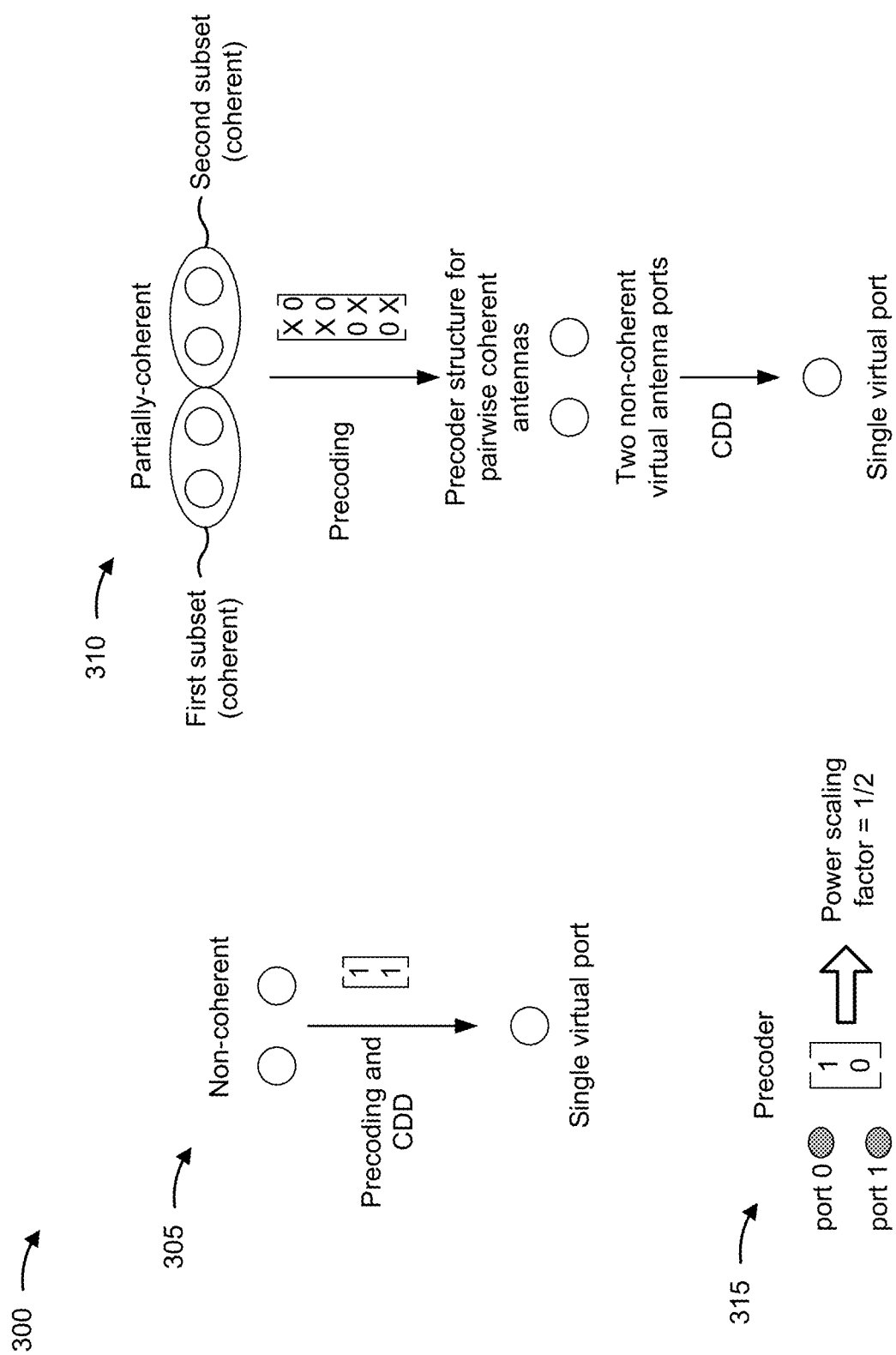
FIG. 3 is a diagram illustrating an example of forming a virtual port by combining non-coherent and/or partially-coherent antenna ports, in accordance with various aspects of the present disclosure.

FIG. 3 is a diagram illustrating an example 300 of forming a virtual port by combining non-coherent and/or partially-coherent antenna ports, in accordance with various aspects of the present disclosure.

A multi-antenna UE 120 and/or a set of antenna ports of the UE 120 may be classified into one of three groups depending on coherence of the antenna ports of the UE 120. A set of antenna ports (e.g., two antenna ports) are coherent if the relative phase among the set of antenna ports (e.g., between the two antenna ports) remains the same between the time of a sounding reference signal (SRS) transmission from those antenna ports and a subsequent physical uplink shared channel (PUSCH) transmission from those antenna ports. When this is the case, the SRS can be used (e.g., by the UE 120 and/or a base station 110) to determine an uplink precoder for precoding the PUSCH transmission, since the relative phase of the antenna ports will be the same for the SRS transmission and the PUSCH transmission. In this case, precoding can span across the set of coherent antenna ports (sometimes referred to herein as coherent ports). If a set of antenna ports is not coherent (i.e., non-coherent), then such an uplink precoder determination becomes difficult, because the relative phase of the antenna ports will change from the SRS transmission to the PUSCH transmission.

For example, a set of antenna ports is considered non-coherent if the relative phase among the set of antenna ports is different for the SRS transmission and the PUSCH transmission. In this case, precoding does not span across the set of non-coherent antenna ports (sometimes referred to as non-coherent ports). Furthermore, a set of antenna ports is considered partially-coherent if a first subset of the set of antenna ports is coherent with one another and a second subset of the set of antenna ports is coherent with one another, but the first subset of antenna ports and the second subset of antenna ports are not coherent with one another. In this case, common precoding may be used within the subsets of coherent ports, but not across the subsets of non-coherent ports. However, certain techniques can be applied to synthesize a virtual antenna port (sometimes referred to herein as a virtual port) from antenna ports that lack coherence (e.g., so that common precoding can be used on the virtual port and applied to the non-coherent antenna ports).

For example, as shown by reference number 305, a set of non-coherent antenna ports (e.g., shown as two non-coherent antenna ports) can be combined into a single virtual port using precoding (e.g., uplink precoding, precoding by subchannel weighting using a TPMI, precoding for spatial division multiplexing, and/or the like) and cyclic delay diversity. The precoder may be determined by the UE 120 and/or signaled by a base station 110. Cyclic delay diversity (CDD) may refer to a technique where a delay (e.g., a cyclic delay) is introduced on one of the non-coherent ports and not on the other non-coherent port. The delay may be measured in samples (e.g., 5 samples, 10 samples, and/or the like), fractions of samples, and/or the like. For example, a first non-coherent port may transmit a first stream of samples, and the second non-coherent port may transmit a second stream of samples (e.g., which may be the same stream) with a slight cyclic delay (e.g., a delay of 5 samples, 10 samples, and/or the like). For example, for a cyclic delay of 5 samples, where 16 samples are transmitted per symbol, the first non-coherent port may transmit the 16 samples with a first sample transmitted first (e.g., [s1, s2, s3, s4, . . . , s16]), and the second non-coherent port may transmit the 16 samples with the first sample transmitted sixth (e.g., with a delay of five samples) (e.g., [s12, s13, s14, s15, s16, s1, s2, s3, . . . , s11]).

Additionally, or alternatively, as shown by reference number 310, a set of partially-coherent antenna ports (sometimes referred to herein as partially-coherent ports) can be combined into a single virtual port using precoding (e.g., uplink precoding) and cyclic delay diversity, in a similar manner as described above. As shown, a first subset of ports may be coherent with one another, and a second subset of ports may be coherent with one another, but the two subsets may not be coherent with one another. As further shown, precoding may be applied to the individual subsets to generate a first virtual port and a second virtual port that are not coherent with one another. Then, CDD may be applied to these two virtual ports (e.g., by transmitting communications from the virtual ports using CDD), thereby forming a single virtual port from the partially-coherent ports (e.g., using precoding and CDD).

When a UE 120 is configured with multiple SRS ports for a multiple-input multiple-output (MIMO) mode, the UE 120 may be required to split a transmit power equally across all antenna ports used for a PUSCH transmission using a power scaling factor. The power scaling factor may be equal to the number of antenna ports with non-zero PUSCH transmission power divided by the maximum number of SRS ports supported by the UE 120 in one SRS resource. In this case, the UE 120 may not be able to transmit with maximum transmit power because the UE 120 is required to split the transmit power equally across all antenna ports on which the UE is configured to transmit a PUSCH communication. For example, as shown by reference number 315, when the UE 120 uses precoding to transmit on a single port (shown as port 0) of two configured ports (port 0 and port 1), the transmit power of the transmission on the single port (port 0) is scaled by a factor of ½ (one half).

In some cases, a base station 110 may need to instruct a UE 120 to transmit at maximum power, such as when the UE 120 is located near a cell edge or otherwise has poor link quality with the base station 110. However, different UEs 120 may have different capabilities regarding virtual port synthesis and which virtual ports of the UE 120 are capable of supporting a maximum transmit power. For example, the UE 120 may or may not be capable of synthesizing a virtual port that supports a maximum transmit power (e.g., of a power class of the UE 120) and/or may only be capable of supporting a maximum transmit power for a virtual port that is a combination of a specific set of actual antenna ports of the UE 120, depending on the hardware components of the UE 120, a number of transmit antennas of the UE 120, a number of transmit chains of the UE 120, a maximum transmit power supported by different power amplifiers and/or different combinations of power amplifiers of the UE 120, and/or the like.

In order for a base station 110 to instruct a UE 120 regarding a precoder (e.g., corresponding to a transmitted precoding matrix indicator (TPMI)) to be used to transmit at maximum power, the base station 110 needs to know which precoder(s) of the UE 120 are capable of supporting transmissions at the maximum power. However, the base station 110 may not have information regarding such capabilities of the UE 120, which may result in an instruction to transmit at maximum power using a precoder with which the UE 120 is not capable of transmitting at the maximum power. Some techniques and apparatuses described herein permit a UE 120 to signal capabilities regarding virtual ports of the UE 120 that support a maximum transmit power, precoders (e.g., TPMIs) that support a maximum transmit power for the UE 120, and/or the like. In this way, the base station 110 may configure and/or instruct the UE 120 to transmit at maximum transmit power using a virtual port and/or precoder that supports the maximum transmit power. Furthermore, some techniques and apparatuses described herein permit the UE 120 to transmit at maximum transmit power using a virtual port, despite the power scaling requirement described above.

Although FIG. 3 shows pairs of antenna ports in sets and subsets, in some aspects, a different number of antenna ports may be included in a set or a subset. For example, a set of antenna ports or subset of antenna ports may include three antenna ports, four antenna ports, and/or the like.

As indicated above, FIG. 3 is provided as an example. Other examples may differ from what is described with regard to FIG. 3.

Figure 4:
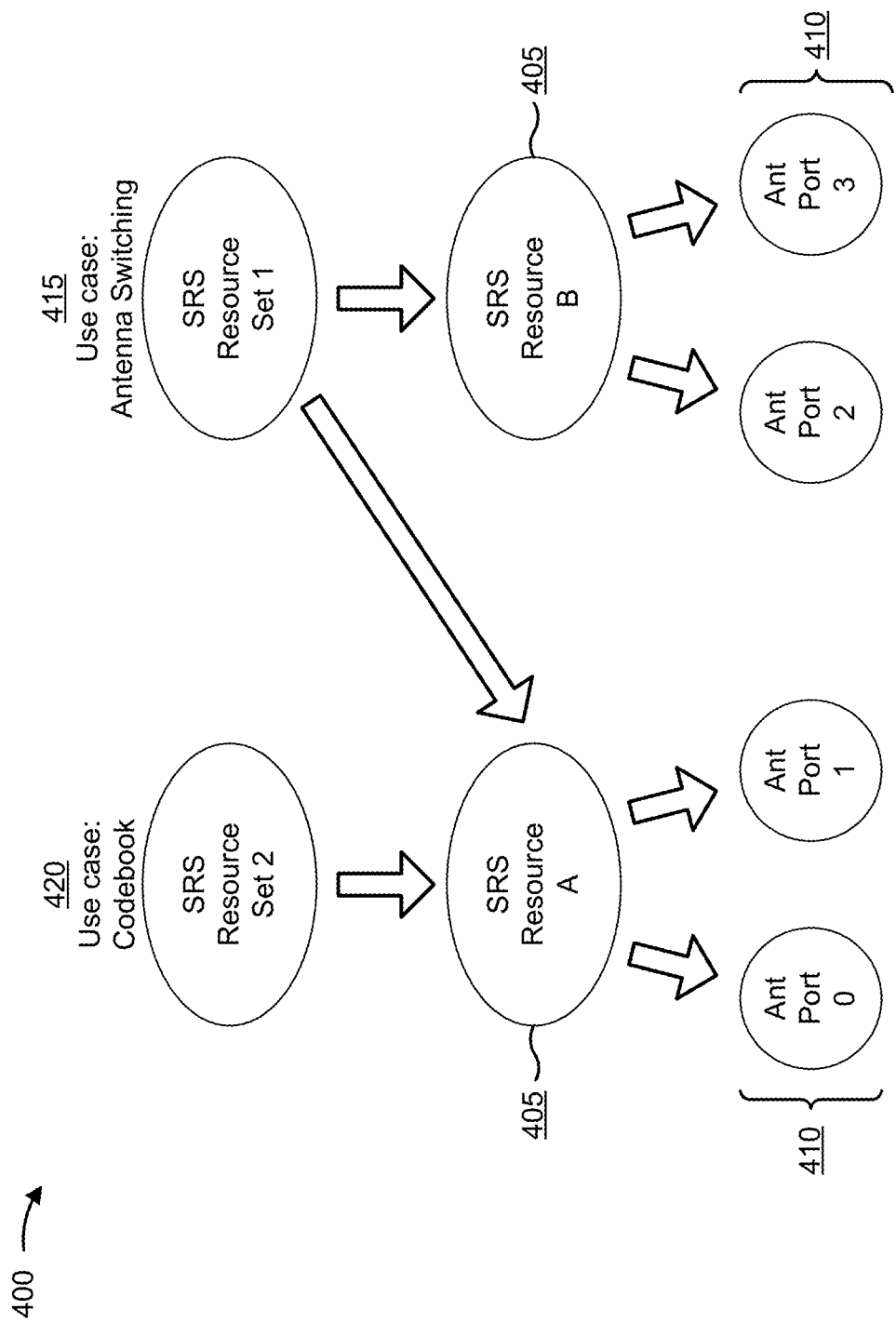
FIG. 4 is a diagram illustrating an example of sounding reference signal resource sets, in accordance with various aspects of the present disclosure.

FIG. 4 is a diagram illustrating an example 400 of sounding reference signal (SRS) resource sets, in accordance with various aspects of the present disclosure.

A base station 110 may configure a UE 120 with one or more SRS resource sets to allocate resources for SRS transmissions by the UE 120. For example, a configuration for SRS resource sets may be indicated in a radio resource control (RRC) message (e.g., an RRC configuration message, an RRC reconfiguration message, and/or the like). As shown by reference number 405, an SRS resource set may include one or more resources (e.g., shown as SRS resources), which may include time resources and/or frequency resources (e.g., a slot, a symbol, a resource block, a periodicity for the time resources, and/or the like).

As shown by reference number 410, an SRS resource may include one or more antenna ports on which an SRS is to be transmitted (e.g., in a time-frequency resource). Thus, a configuration for an SRS resource set may indicate one or more time-frequency resources in which an SRS is to be transmitted, and may indicate one or more antenna ports on which the SRS is to be transmitted in those time-frequency resources. In some aspects, the configuration for an SRS resource set may indicate a use case (e.g., in an SRS-SetUse information element) for the SRS resource set. For example, an SRS resource set may have a use case of antenna switching, codebook, non-codebook, beam management, and/or the like.

An antenna switching SRS resource set may be used to indicate downlink channel state information (CSI) with reciprocity between an uplink and downlink channel. For example, when there is reciprocity between an uplink channel and a downlink channel, a base station 110 may use an antenna switching SRS (e.g., an SRS transmitted using a resource of an antenna switching SRS resource set) to acquire downlink CSI (e.g., to determine a downlink precoder to be used to communicate with the UE 120) based at least in part on uplink CSI determined using the antenna switching SRS.

A codebook SRS resource set may be used to indicate uplink CSI when a base station 110 indicates an uplink precoder to the UE 120. For example, when the base station 110 is configured to indicate an uplink precoder to the UE 120 (e.g., using a precoder codebook), the base station 110 may use a codebook SRS (e.g., an SRS transmitted using a resource of a codebook SRS resource set) to acquire uplink CSI (e.g., to determine an uplink precoder to be indicated to the UE 120 and used by the UE 120 to communicate with the base station 110). In some aspects, virtual ports (e.g., a combination of two or more antenna ports) with a maximum transmit power may be supported at least for a codebook SRS.

A non-codebook SRS resource set may be used to indicate uplink CSI when the UE 120 selects an uplink precoder (e.g., instead of the base station 110 indicating an uplink precoder to be used by the UE 120). For example, when the UE 120 is configured to select an uplink precoder, the base station 110 may use a non-codebook SRS (e.g., an SRS transmitted using a resource of a non-codebook SRS resource set) to acquire uplink CSI. In this case, the non-codebook SRS may be precoded using a precoder selected by the UE 120 (e.g., which may be indicated to the base station 110).

A beam management SRS resource set may be used for indicating CSI for millimeter wave communications.

As shown in FIG. 4, in some aspects, different SRS resource sets indicated to the UE 120 (e.g., having different use cases) may overlap (e.g., in time, in frequency, and/or the like, such as in the same slot). For example, as shown by reference number 415, a first SRS resource set (e.g., shown as SRS Resource Set 1) is shown as having an antenna switching use case. As shown, this example antenna switching SRS resource set includes a first SRS resource (shown as SRS Resource A) and a second SRS resource (shown as SRS Resource B). Thus, antenna switching SRS may be transmitted in SRS Resource A (e.g., a first time-frequency resource) using antenna port 0 and antenna port 1, and may be transmitted in SRS Resource B (e.g., a second time-frequency resource) using antenna port 2 and antenna port 3.

As shown by reference number 420, a second SRS resource set (e.g., shown as SRS Resource Set 2) may be a codebook use case. As shown, this example codebook SRS resource set includes only the first SRS resource (shown as SRS Resource A). Thus, codebook SRS may be transmitted in SRS Resource A (e.g., the first time-frequency resource) using antenna port 0 and antenna port 1. In this case, the UE 120 may not transmit code book SRS in SRS Resource B (e.g., the second time-frequency resource) using antenna port 2 and antenna port 3.

As described above in connection with FIG. 3, when a UE 120 is configured with multiple SRS ports for a MIMO mode, the UE 120 may be required to split a transmit power equally across all antenna ports used for a PUSCH transmission using a power scaling factor. In this case, the UE 120 may not be able to transmit with maximum transmit power using a virtual port that is a combination of multiple non-coherent ports and/or multiple partially-coherent ports, because the UE 120 is required to split the transmit power equally across all antenna ports on which the UE transmits a PUSCH communication with non-zero transmit power. Some techniques and apparatuses described herein permit the UE 120 to transmit at maximum transmit power using a virtual port that includes multiple ports (e.g., configured by an SRS configuration).

As indicated above, FIG. 4 is provided as an example. Other examples may differ from what is described with regard to FIG. 4.

Figure 5:
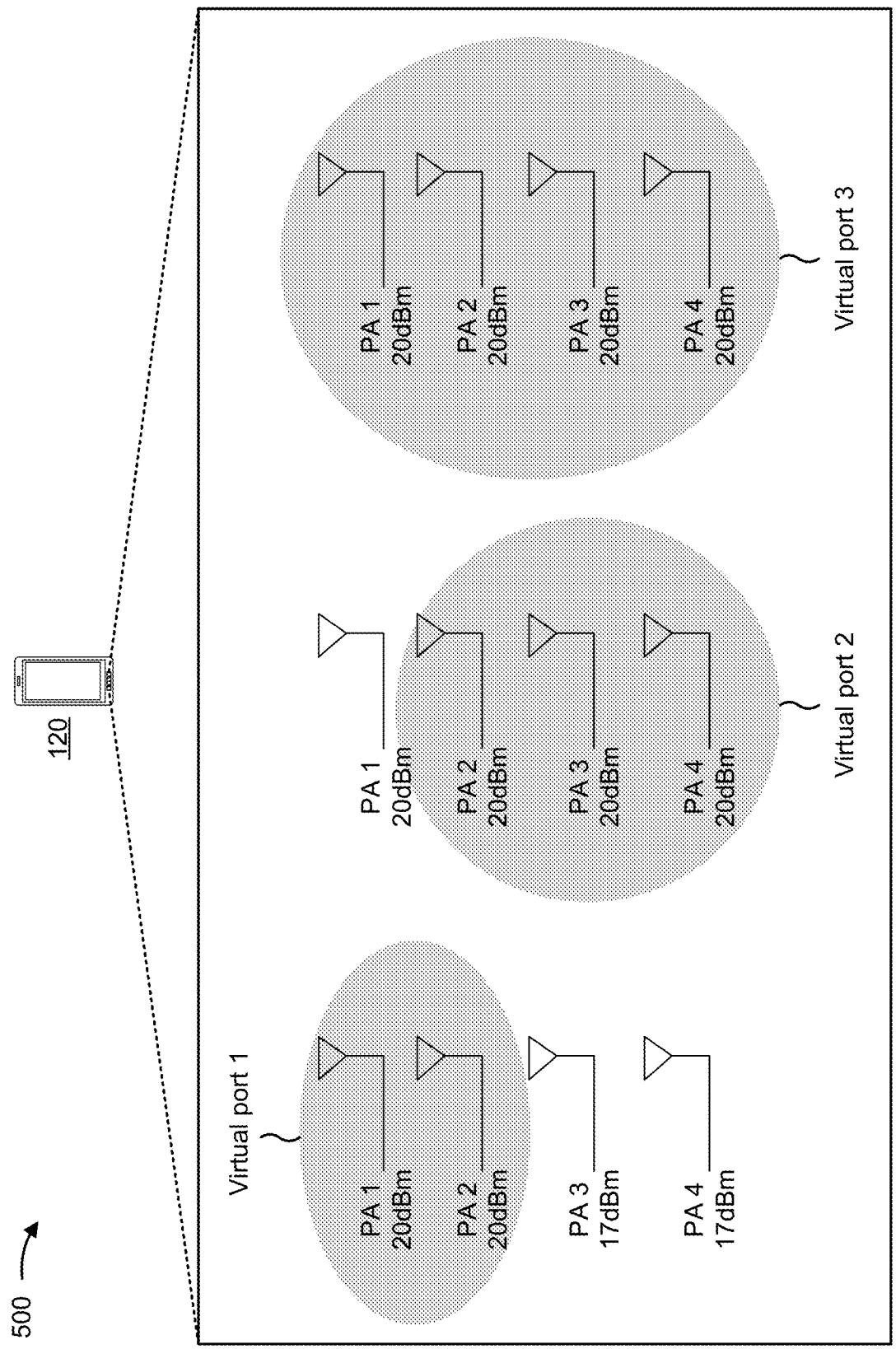
FIG. 5 is a diagram illustrating an example of a UE hardware architecture that supports maximum transmit power using virtual ports, in accordance with various aspects of the present disclosure.

FIG. 5 is a diagram illustrating an example 500 of a UE hardware architecture that supports maximum transmit power using virtual ports, in accordance with various aspects of the present disclosure.

As shown in FIG. 5, a capability of a UE 120 to use virtual ports to support a maximum transmit power for a power class of the UE 120 may depend on a hardware architecture of the UE 120. Specifically, this capability of the UE 120 may depend on a number of transmit antennas (or transmit chains) of the UE 120, a number of power amplifiers of the UE 120, a transmit power capable of being supplied by each of those power amplifiers, and/or the like. As an example, the UE 120 of FIG. 5 is shown as having a first power amplifier (PA1) that supports a maximum power of 20 decibel-milliwatts (dBm), a second power amplifier (PA2) that supports a maximum power of 20 dBm, a third power amplifier (PA3) that supports a maximum power of 17 dBm, and a fourth power amplifier (PA4) that supports a maximum power of 17 dBm.

In some aspects, a UE 120 described herein may have a hardware architecture where a subset (e.g., fewer than all) of the power amplifiers of the UE 120 individually support a maximum transmit power of the UE 120 (e.g., without combining of antenna ports). For example, if the UE 120 is power class 3 with a maximum transmit power of 23 dBm, then fewer than all of the power amplifiers of the UE 120 may individually support 23 dBm transmissions. In example 500, none of the power amplifiers of the UE 120 individually (e.g., without combining of antenna ports) support a maximum transmit power of 23 dBm. However, in other examples, one of the four power amplifiers may individually support the maximum transmit power of 23 dBm, two of the four power amplifiers may individually support the maximum transmit power of 23 dBm, or three of the four power amplifiers may individually support the maximum transmit power of 23 dBm. For a UE 120 with two power amplifiers (and two corresponding antennas), none of the two power amplifiers may individually support the maximum transmit power of 23 dBm, or one of the two power amplifiers may individually support the maximum transmit power of 23 dBm.

Using this hardware architecture, for a UE 120 in power class 3 having a maximum transmit power of 23 dBm, that maximum transmit power can be achieved by synthesizing a virtual port using PA1 and PA2 (shown as virtual port 1), by synthesizing a virtual port using PA2, PA3, and PA4 (shown as virtual port 2), by synthesizing a virtual port using all four power amplifiers (shown as virtual port 3), and/or the like. However, this is only one example of a hardware architecture for a UE 120, and different UEs 120 may have different hardware architectures, such as a different number of transmit antennas (or transmit chains), a different number of power amplifiers, different transmit powers capable of being supplied by different power amplifiers, and/or the like. Thus, some UEs 120 may not be capable of synthesizing a virtual port that supports a maximum transmit power for a power class of the UE 120, different UEs 120 may be capable of synthesizing different numbers of virtual ports that support a maximum transmit power, and different UEs 120 may be capable of synthesizing virtual ports that support a maximum transmit power using different precoders (e.g., different combinations of antennas and/or power amplifiers).

As indicated above in connection with FIG. 3, in order for a base station 110 to instruct a UE 120 regarding a precoder (e.g., a TPMI) to be used to transmit at maximum power, the base station 110 needs to know which precoder(s) of the UE 120 are capable of supporting transmissions at the maximum power. However, the base station 110 may not have information regarding such capabilities of the UE 120, which may result in an instruction to transmit at maximum power using a precoder with which the UE 120 is not capable of transmitting at the maximum power. Some techniques and apparatuses described herein permit a UE 120 to signal capabilities regarding virtual ports of the UE 120 that support a maximum transmit power, precoders (e.g., TPMIs) that support a maximum transmit power for the UE 120, and/or the like. In this way, the base station 110 may configure and/or instruct the UE 120 to transmit at maximum transmit power using a virtual port and/or precoder that supports the maximum transmit power.

As indicated above, FIG. 5 is provided as an example. Other examples may differ from what is described with regard to FIG. 5.

Figure 6:
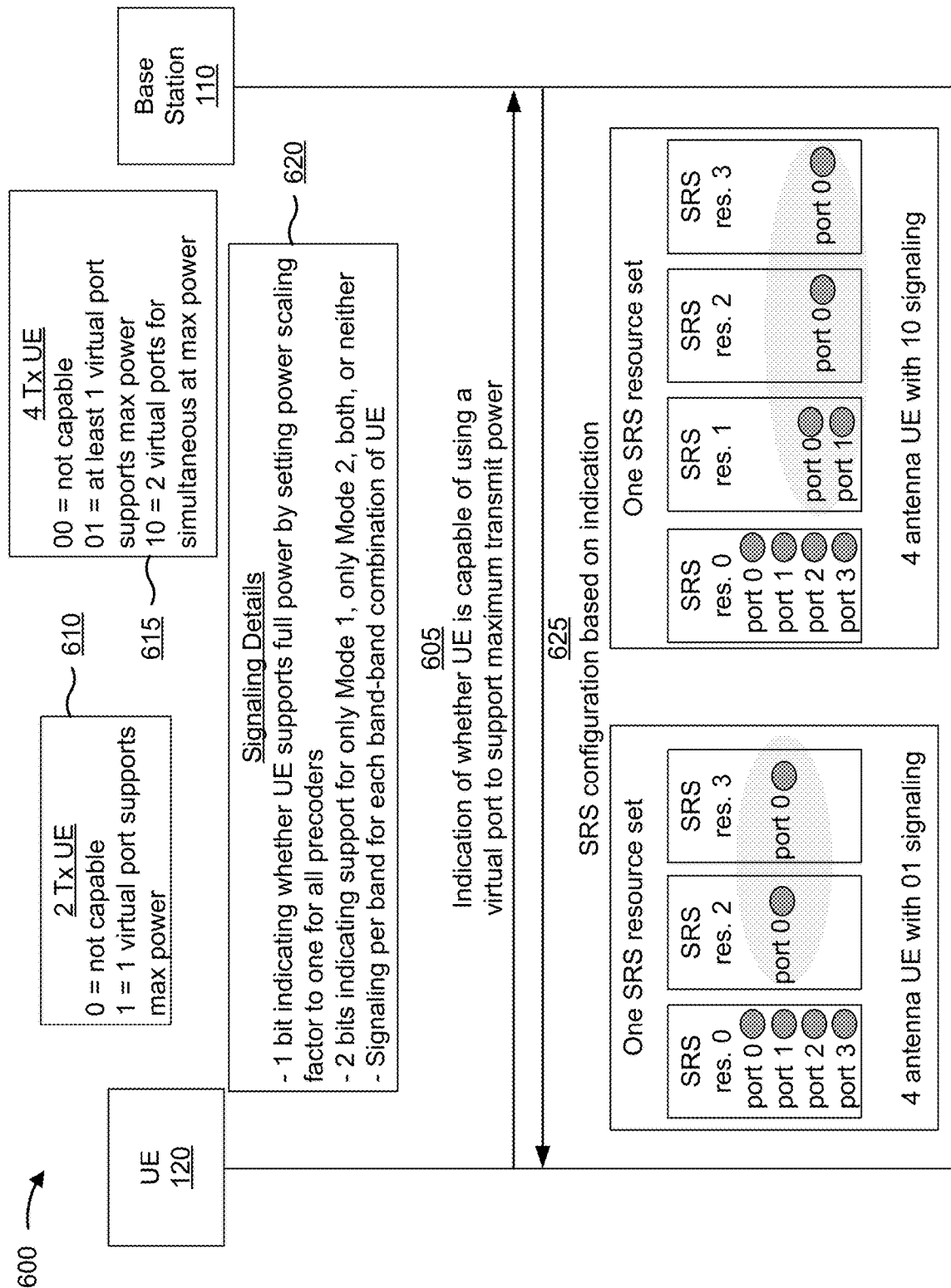
FIGS. 6-10 are diagrams illustrating examples of signaling and configuration of maximum transmit power using virtual ports, in accordance with various aspects of the present disclosure.

FIG. 6 is a diagram illustrating an example 600 of signaling and configuration of maximum transmit power using virtual ports, in accordance with various aspects of the present disclosure. As shown in FIG. 6, a UE 120 and a base station 110 may communicate with one another.

As shown by reference number 605, the UE 120 may transmit, to the base station 110, an indication of whether the UE 120 is capable of using a virtual port to transmit uplink communications using a maximum transmit power. The maximum transmit power may be defined by a power class of the UE 120. For example, the maximum transmit power may be 23 dBm for a UE 120 of power class 3. As described elsewhere herein, a virtual port may be a combination of two or more non-coherent or partially-coherent antenna ports of the UE 120. For example, the two or more non-coherent or partially-coherent antenna ports may be combined (e.g., synthesized, aggregated, used together, and/or the like) using precoding and/or cyclic delay diversity to synthesize the virtual port. Thus, in some aspects, a virtual port may be a combination of multiple antenna ports (e.g., two or more antenna ports that are combined using precoding and/or cyclic delay diversity). Alternatively, a virtual port may be a single actual antenna port, where the single actual antenna port is switched to and powered by a power amplifier (e.g., a higher rated power amplifier than a power amplifier from which the single actual antenna port is switched) that is capable of transmitting at the maximum transmit power without being combined with another antenna port. In some aspects, a UE 120 that is capable of using a virtual port to transmit uplink communications using a maximum transmit power may be referred to as a Mode 2 UE, while a Mode 1 UE may refer to a UE 120 that is not capable of synthesizing a virtual port, but that is capable of supporting the maximum transmit power by using non-coherent ports and/or partially-coherent ports, as well as cyclic delay diversity, to achieve fully-coherent precoders. In some aspects, a Mode 1 UE may support the maximum transmit power using precoders that span across non-coherent antenna ports. For example, a Mode 1 UE may support the maximum transmit power using precoding and cyclic delay diversity.

Additionally, or alternatively, the UE 120 may transmit, to the base station 110, an indication of a number of virtual ports that the UE 120 is capable of using to transmit uplink communications using the maximum transmit power. For example, the UE 120 may indicate that the UE 120 is capable of synthesizing only one (e.g., a single) virtual port that supports the maximum transmit power. As another example, the UE 120 may indicate that the UE 120 is capable of synthesizing multiple virtual ports that support the maximum transmit power. In some aspects, the UE 120 may use a single message, a single set of bits, and/or a single field of a message to indicate whether the UE 120 is capable of using a virtual port to transmit uplink communications using a maximum transmit power and to indicate a number of virtual ports that the UE 120 is capable of using to transmit uplink communications using the maximum transmit power.

As shown by reference number 610, as an example for a UE 120 with two transmit antennas (and/or two transmit chains), the UE 120 may transmit a one bit indication (e.g., a single bit). A first value of the bit (e.g., 0) may indicate that the UE 120 is not capable of using a virtual port to transmit uplink communications using the maximum transmit power. A second value of the bit (e.g., 1) may indicate that the UE 120 is capable of using a single virtual port to transmit uplink communications using the maximum transmit power.

As shown by reference number 615, as an example for a UE 120 with four transmit antennas (and/or four transmit chains), the UE 120 may transmit a two bit indication. A first value of the indication (e.g., 00) may indicate that the UE 120 is not capable of using a virtual port to transmit uplink communications using the maximum transmit power. A second value of the indication (e.g., 01) may indicate that the UE 120 is capable of using at least one virtual port (e.g., one or more virtual ports) to transmit uplink communications using the maximum transmit power, such as when the UE 120 is a power class 3 UE with four power amplifiers that are each capable of a maximum of 17 dBm transmission (e.g., where all four 17 dBm power amplifiers are combined to generate 23 dBm of power). A third value of the indication (e.g., 10) may indicate that the UE 120 is capable of using two virtual ports to transmit simultaneous uplink communications (e.g., using different MIMO layers) using the maximum transmit power on each of the two virtual ports, such as when the UE 120 is a power class 3 UE with four power amplifiers that are each capable of a maximum of 20 dBm transmission (e.g., where a first 20 dBm power amplifier and a second 20 dBm power amplifier are combined to generate 23 dBm of power, and a third 20 dBm power amplifier and a fourth 20 dBm power amplifier are combined to generate 23 dBm of power). In some aspects, a value of the indication may indicate an exact number of virtual ports that the UE 120 is capable of using to transmit uplink communications using the maximum transmit power (e.g., one virtual port, two virtual ports, three virtual ports, and so on), such as by using a fourth value of 11. For example, the UE 120 and the base station 110 may store information in memory that indicates an association between the fourth value (e.g., 11) and a particular number of virtual ports (e.g., one) that the UE 120 is capable of using to transmit uplink communications using the maximum transmit power. The UE 120 can then signal that the UE 120 is capable of using that particular number of virtual ports (e.g., one) to transmit uplink communications using the maximum transmit power.

As shown by reference number 620, as another example of UE signaling, the UE 120 may transmit a single bit to indicate whether the UE 120 supports full power (e.g., the maximum transmit power for the power class of the UE 120) by setting a power scaling factor in power control to one for all precoders. This may indicate, for example, whether all transmit chains of the UE 120 include a respective power amplifier that supports the maximum transmit power. In some aspects, a UE 120 that has a fully-rated power amplifier (e.g., a power amplifier that supports a maximum transmit power) included in each transmit chain of the UE 120 may be referred to as a capability 1 UE. If the UE 120 is a capability 1 UE, then the UE 120 need not signal any additional information regarding full power capability of the UE 120. For example, if the UE 120 is a capability 1 UE, then the UE 120 need not signal any information in the two bits described below for indicating support for mode 1 or mode 2, need not signal any information regarding TPMIs that support the maximum transmit power (e.g., as described below in connection with FIGS. 7-10), and/or the like.

As further shown, the UE 120 may transmit two bits that indicate whether the UE 120 supports only Mode 1 and not Mode 2, only Mode 2 and not Mode 1, both Mode 1 and Mode 2, or neither Mode 1 nor Mode 2. Details regarding Mode 1 and Mode 2 are described above. For example, a Mode 1 capability may refer to a capability to support the maximum transmit power using precoders that span across non-coherent antenna ports. As another example, a Mode 2 capability may refer to a capability to support the maximum transmit power using a virtual port. In some aspects, the UE 120 may use these two bits if the UE 120 does not have any transmit chains with a fully-rated power amplifier (sometimes referred to as a capability 2 UE) and/or if fewer than all (e.g., a subset of) the transmit chains of the UE 120 have a fully-rated power amplifier (sometimes referred to as a capability 3 UE). Conversely, the UE 120 need not signal anything in these two bits if the UE 120 is a capability 1 UE, as described above. In some aspects, if the UE 120 supports Mode 2 (e.g., with or without support for Mode 1), then the UE 120 may transmit, to the base station 110, a bitmap that indicates a set of TPMIs that support a maximum transmit power for uplink communications, as described in more detail below in connection with FIGS. 7-10. If the UE 120 does not support Mode 2, then the UE 120 may refrain from transmitting the bitmap (e.g., because the UE 120 does not support virtual ports).

As further shown, the UE 120 may transmit the information described above (e.g., the single bit and/or the two bits) per band for a band-band combination (e.g., band in a band combination) supported by the UE 120 (e.g., per band for each band-band combination supported by the UE 120). For example, the UE 120 may have different capabilities for different bands in each band-band combination. In some aspects, the UE 120 may transmit the information described above for every band in each band-band combination supported by the UE 120. A band-band combination may indicate a combination of bands (e.g., a pair of bands) supported by the UE 120 (e.g., for dual connectivity, carrier aggregation, and/or the like).

In some aspects, the UE 120 may transmit the indication in a field of a capability report (e.g., a UE capability report). In some aspects, the UE 120 may transmit the capability report with an empty or null value in this field, or with this field excluded, when each transmit chain of the UE 120 includes a power amplifier capable of supporting the maximum transmit power (e.g., and thus virtual ports are not necessary to achieve the maximum transmit power).

As shown by reference number 625, the base station 110 may transmit, to the UE 120, an SRS configuration based at least in part on the indication of whether the UE 120 is capable of using a virtual port to transmit uplink communications using a maximum transmit power. For example, the base station 110 may determine the SRS configuration based at least in part on the indication of whether the UE 120 is capable of using a virtual port to transmit uplink communications using a maximum transmit power, and may transmit the determined SRS configuration to the UE 120. Additionally, or alternatively, the base station 110 may determine the SRS configuration based at least in part on an indication, from the UE 120, of a number of virtual ports that the UE 120 is capable of using to transmit uplink communications using the maximum transmit power. The UE 120 may transmit an uplink communication (e.g., an SRS, a data communication, and/or the like) based at least in part on the SRS configuration. Additionally, or alternatively, the UE 120 may transmit the uplink communication using the virtual port. Additionally, or alternatively, the UE 120 may transmit the uplink communication using the maximum transmit power.

In some aspects, the base station 110 may determine a number of SRS resources to be configured for an SRS resource set for the UE 120 based at least in part on the indication. Additionally, or alternatively, the base station 110 may determine a type (e.g., a use case and/or the like) of SRS resources to be configured for an SRS resource set for the UE 120 based at least in part on the indication. The base station 110 may indicate the determined number and/or the determined type of SRS resources configured for an SRS resource set in the SRS configuration transmitted to the UE 120. A type of SRS resource may include, for example, an antenna switching SRS resource, a codebook SRS resource, a non-codebook SRS resource, a beam management SRS resource, and/or the like, as described elsewhere herein.

For example, a base station 110 may normally configure a number of ports, for an SRS resource, that is the same as the number of antenna ports of the UE 120 (e.g., at least for an SRS resource having a codebook use case). For example, for a UE 120 with four transmit antennas, the base station 110 assigns an SRS resource (e.g., a first SRS resource) that includes four antenna ports. However, if the UE 120 is capable of synthesizing one or more virtual ports, then the base station 110 may configure an additional SRS resource (e.g., a second SRS resource) for the one or more virtual ports, shown as SRS resource 2 and SRS resource 3 in FIG. 6. For example, if the UE 120 is capable of synthesizing a single virtual port, then the base station 110 may configure the UE 120 with an additional SRS resource with a single port (e.g., for the single virtual port). As another example, if the UE 120 is capable of synthesizing two virtual ports, then the base station 110 may configure the UE 120 with an additional SRS resource that includes either one port, shown by SRS resource 2 and SRS resource 3 in FIG. 6 (e.g., where the UE 120 selects one of the two virtual ports for sounding using the SRS resource, to conserve SRS overhead), or two ports, shown by SRS resource 1 in FIG. 6 (e.g., one for each virtual port, which allows the UE 120 to sound both virtual ports).

As indicated above, FIG. 6 is provided as an example. Other examples may differ from what is described with regard to FIG. 6.

Figure 7:
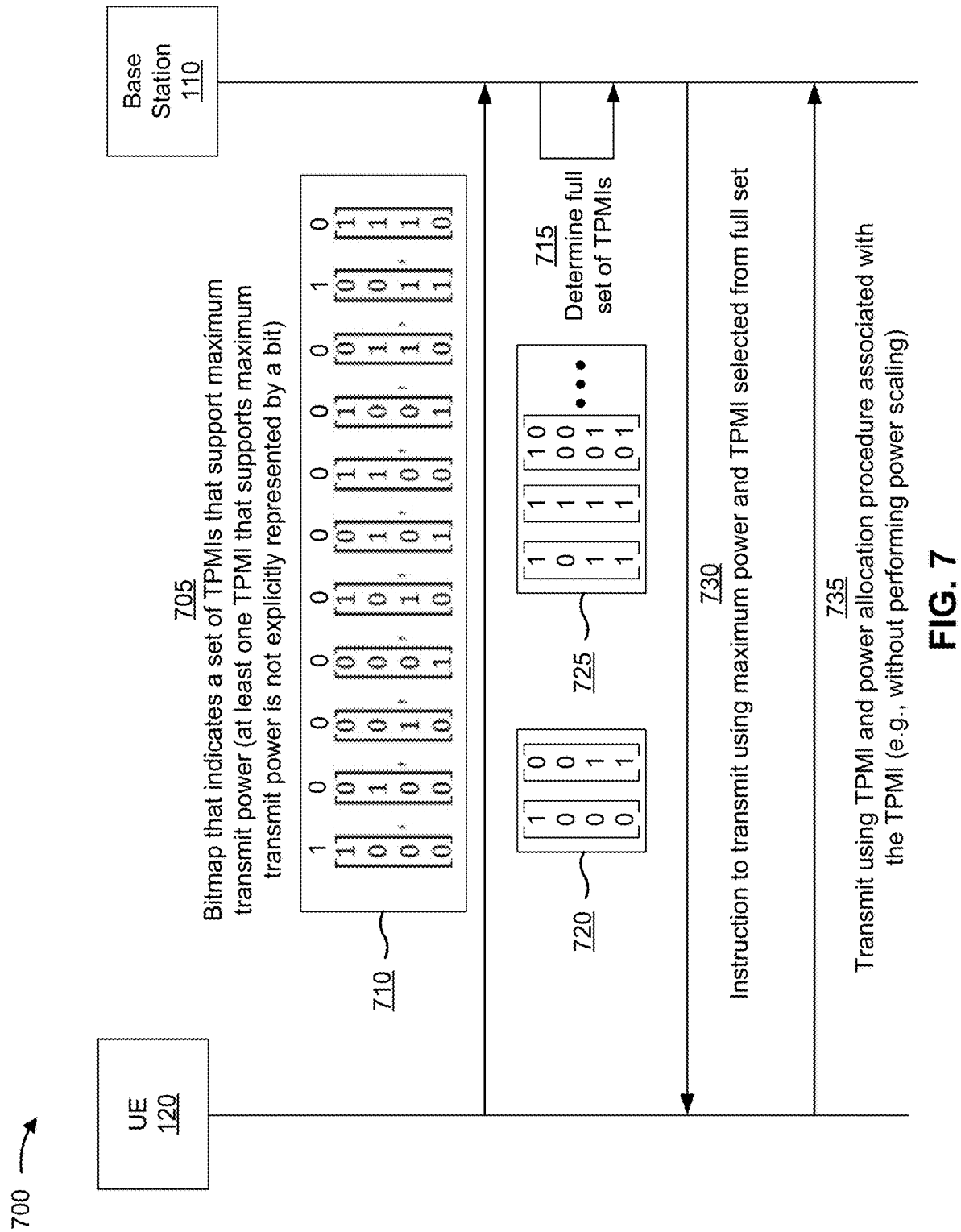

FIG. 7 is a diagram illustrating an example 700 of signaling and configuration of maximum transmit power using virtual ports, in accordance with various aspects of the present disclosure. As shown in FIG. 7, a UE 120 and a base station 110 may communicate with one another.

As shown by reference number 705, the UE 120 may transmit, to the base station 110, a bitmap that indicates a set of transmit precoding matrix indicators (TPMIs) that support a maximum transmit power for uplink communications. As described above, the maximum transmit power may be defined by a power class of the UE 120. A TPMI may indicate a precoder, such as an uplink precoder to be used to transmit (e.g., precode) an uplink communication. In some aspects, the set of TPMIs that support the maximum transmit power includes more TPMIs than a number of TPMIs explicitly indicated by the UE 120 using the bitmap. As a result, at least one TPMI, of the set of TPMIs that support the maximum transmit power, is not represented by an individual bit of the bitmap. Stated another way, at least one TPMI, of the set of TPMIs that support the maximum transmit power, is not represented by any individual bit of the bitmap.

For example, the bitmap may not include (e.g., may exclude) an individual bit that represents a TPMI in which all antennas (and/or all transmit chains) of the UE 120 are used. In this case, if the UE 120 includes four antennas (and/or four transmit chains), then the bitmap may not include a bit that represents a precoder of [1, 1, 1, 1], where a value of 1 in a precoding matrix indicates that a corresponding antenna (and/or transmit chain) is used for an uplink communication. Additionally, or alternatively, the bitmap may not include any bits that explicitly represent a multi-layer TPMI. In this case, each bit in the bitmap corresponds to a single-layer TPMI. By using a bitmap that does not have a bit that explicitly represents every possible TPMI capable of supporting the maximum transmit power, signaling overhead may be reduced. Furthermore, the base station 110 may be able to derive TPMIs that support the maximum transmit power and that are not explicitly indicated by a corresponding bit using the TPMIs that are explicitly indicated by a corresponding bit, as described in more detail below.

As shown by reference number 710, in some aspects, the bitmap may be 11 (eleven) bits in length. For example, when the UE 120 includes four transmit chains and four transmit antennas, and when connections between transmit chains and transmit antennas are not reconfigurable (as described in more detail below in connection with FIGS. 8-10), then the bitmap may be 11 bits in length. In an example 11-bit bitmap, a first bit of the bitmap indicates support for the maximum transmit power using only a first antenna of the UE 120 (shown as [1 0 0 0]), a second bit of the bitmap indicates support for the maximum transmit power using only a second antenna of the UE 120 (shown as [0 1 0 0]), a third bit of the bitmap indicates support for the maximum transmit power using only a third antenna of the UE 120 (shown as [0 0 1 0]), a fourth bit of the bitmap indicates support for the maximum transmit power using only a fourth antenna of the UE 120 (shown as [0 0 0 1]), a fifth bit of the bitmap indicates support for the maximum transmit power using only the first antenna and the third antenna (shown as [1 0 1 0]), a sixth bit of the bitmap indicates support for the maximum transmit power using only the second antenna and the fourth antenna (shown as [0 1 0 1]), a seventh bit of the bitmap indicates support for the maximum transmit power using only the first antenna and the second antenna (shown as [1 1 0 0]), an eighth bit of the bitmap indicates support for the maximum transmit power using only the first antenna and the fourth antenna (shown as [1 0 0 1]), a ninth bit of the bitmap indicates support for the maximum transmit power using only the second antenna and the third antenna (shown as [0 1 1 0]), a tenth bit of the bitmap indicates support for the maximum transmit power using only the third antenna and the fourth antenna (shown as [0 0 1 1]), and an eleventh bit of the bitmap indicates support for the maximum transmit power using only the first antenna, the second antenna, and the third antenna (shown as [1 1 1 0]). Using this combination of TPMIs (e.g., which may include a subset of the full set of TPMIs that support the maximum transmit power for the UE 120), the base station 110 may be able to derive the full set of TPMIs that support the maximum transmit power for the UE 120. In some aspects, the first antenna has the largest maximum transmit power and the fourth antenna has the smallest maximum transmit power. Thus, [1 1 1 0] may be indicated rather than [1 1 0 1], [1 0 1 1], and/or [0 1 1 1].

In some aspects, the bitmap indicated by the UE 120 may include a different number of bits than described in connection with FIG. 7. In some aspects, the number of bits included in the bitmap may depend on a number of transmit chains included in the UE 120, a number of transmit antennas included in the UE 120, whether connections between transmit chains of the UE 120 and transmit antennas of the UE 120 are reconfigurable, and/or the like. In some aspects, the UE 120 may transmit, to the base station 110, an indication of whether connections between transmit chains of the UE 120 and transmit antennas of the UE 120 are reconfigurable. Additional details are described below in connection with FIGS. 8-10.

In some aspects, the UE 120 may under-report the TPMIs that support the maximum transmit power for the UE 120. For example, the full set of TPMIs indicated by the UE 120 (e.g., explicitly and/or implicitly) may include fewer TPMIs than all of the TPMIs that actually support the maximum transmit power for the UE 120. In this way, the UE 120 may avoid revealing details regarding a hardware architecture of the UE 120.

As shown by reference number 715, the base station 110 may determine the full set of TPMIs that support the maximum transmit power for the UE 120. As shown by reference number 720, the full set of TPMIs may include a first set (e.g., an explicit set) of TPMIs that are explicitly represented by a bit in the bitmap. In example 700, the UE 120 transmits a 1 for the first bit of the bitmap corresponding to a TPMI of [1 0 0 0], transmits a 1 for the tenth bit of the bitmap corresponding to a TPMI of [0 0 1 1], and transmits zeros for all other bits in the bitmap. Thus, the UE 120 explicitly indicates (e.g., using a corresponding bit in the bitmap) that TPMIs [1 0 0 0] and [0 0 1 1] support the maximum transmit power for the UE 120.

As shown by reference number 725, the full set of TPMIs may include a second set (e.g., an implicit set) of TPMIs that are not explicitly represented by a bit in the bitmap. The base station 110 may determine the second set of TPMIs using the first set of TPMIs explicitly indicated by the UE 120. For example, by explicitly indicating that TPMIs [1 0 0 0] and [0 0 1 1] support the maximum transmit power for the UE 120, the UE 120 may implicitly indicate that single-layer TPMIs [1 0 1 1] and [1 1 1 1] also support the maximum transmit power for the UE 120. In some aspects, TPMI [1 1 1 1] may always support the maximum transmit power for the UE 120, and thus need not be explicitly indicated using the bitmap. Furthermore, by explicitly indicating that TPMIs [1 0 0 0] and [0 0 1 1] support the maximum transmit power for the UE 120, the UE 120 may implicitly indicate that the multi-layer TPMI having a first layer of [1 0 0 0] and a second layer of [0 0 1 1] also supports the maximum transmit power for the UE 120. These implicitly indicated TPMIs are provided as examples, and other implicit TPMIs may be determined by the base station 110 based at least in part on the explicit TPMIs.

As another example, if the UE 120 explicitly indicates that TPMIs [1 0 0 0] and [0 1 1 0] support the maximum transmit power for the UE 120, this implies that TPMI [1 1 1 0] and [1 1 1 1] also support the maximum transmit power for the UE 120. However, [1 1 1 0] may still be included in the 11-bit bitmap in case none of the other TPMIs in the 11-bit bitmap support the maximum transmit power and the UE 120 is capable of achieving the maximum transmit power using TPMI [1 1 1 0].

As shown by reference number 730, the base station 110 may transmit an instruction, to the UE 120, for the UE 120 to transmit an uplink communication using the maximum transmit power. The base station 110 may also indicate a TPMI to be used for the uplink transmission. The base station 110 may select the TPMI from the full set of TPMIs that support the maximum transmit power for the UE 120. Thus, when the base station 110 instructs the UE 120 to transmit using the maximum transmit power, the base station 110 can also indicate a TPMI that supports the maximum transmit power due to the UE bitmap indication transmitted to the base station 110. Without such an indication, the base station 110 may instruct the UE 120 to transmit an uplink communication using a maximum transmit power and a TPMI that does not support the maximum transmit power, resulting in an error, a UE incompatibility, an uplink transmission at less than the maximum transmit power, and/or the like.

As shown by reference number 735, the UE 120 may transmit an uplink communication using a TPMI (e.g., a first TPMI) included in the set of TPMIs. For example, the UE 120 may transmit the uplink communication using the TPMI indicated by the base station 110, which is included in the full set of TPMIs that support the maximum transmit power. The UE 120 may transmit the uplink communication using the maximum transmit power as per the instruction from the base station 110. In this case, the UE 120 may transmit the uplink communication using a power allocation procedure associated with transmissions that use the TPMI. For example, the UE 120 may transmit the uplink communication by refraining from performing power scaling for the uplink communication, by refraining from applying a power scaling factor to the uplink communication, by refraining from performing one or more power scaling steps when transmitting the uplink communication, and/or the like. In this way, the UE 120 may be capable of transmitting the uplink communication using the maximum transmit power despite the uplink communication being transmitted using multiple antenna ports.

As indicated above, FIG. 7 is provided as an example. Other examples may differ from what is described with regard to FIG. 7.

Figure 8:
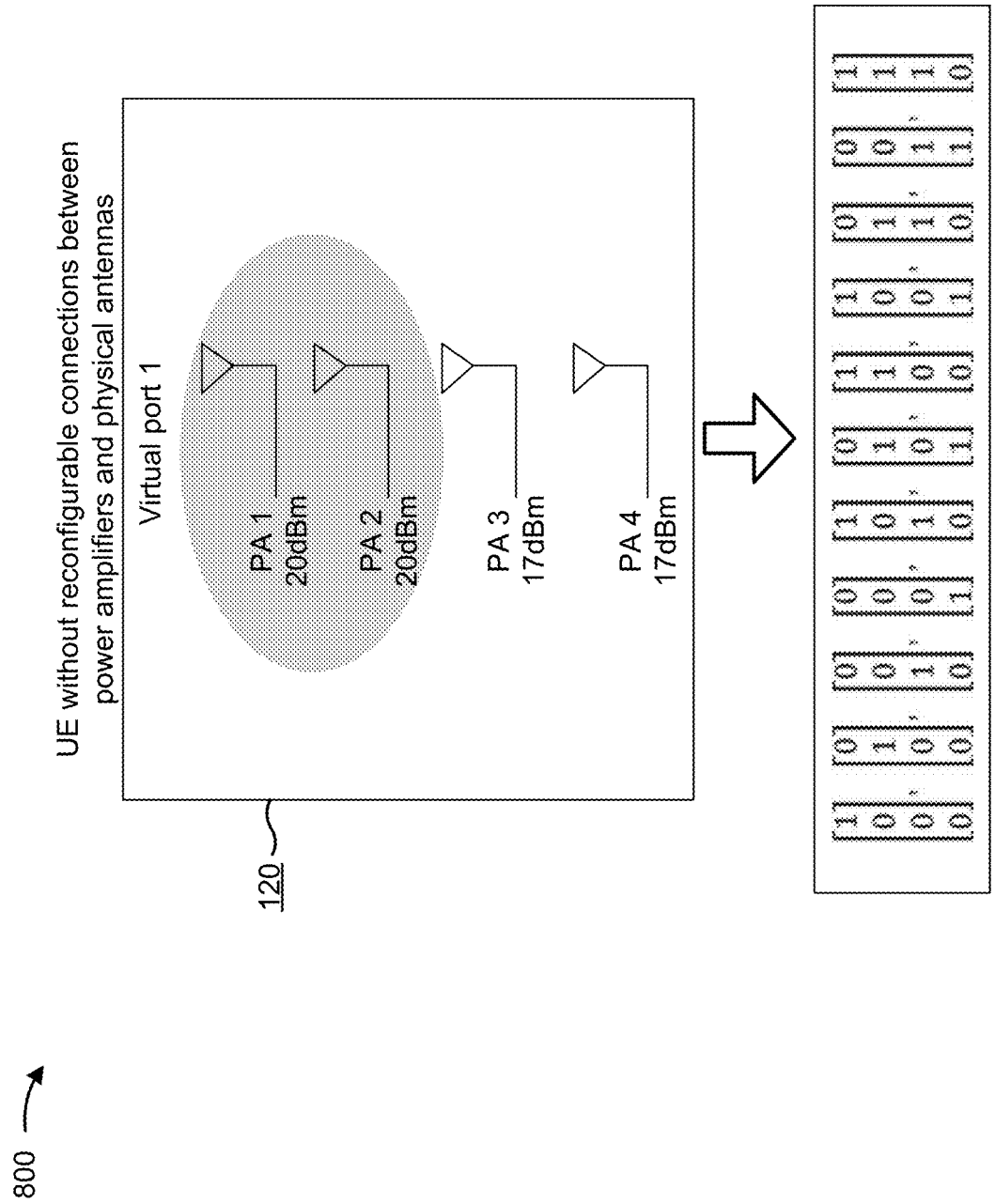

FIG. 8 is a diagram illustrating an example 800 of signaling and configuration of maximum transmit power using virtual ports, in accordance with various aspects of the present disclosure.

As shown in FIG. 8, in some aspects, a UE 120 may include four transmit antennas and four transmit chains. Each transmit chain may include a power amplifier. In example 800, connections between transmit chains (or power amplifiers) and antennas are not reconfigurable due to the hardware architecture of the UE 120. For example, a power amplifier of a transmit chain may have a fixed connection with an antenna (e.g., a soldered connection, a wired connection without a switch, and/or the like), the transmit chain may not include a switch that permits the transmit chain and/or the power amplifier to be connected to a different antenna, and/or the like. In this case, the bitmap used by the UE 120 to indicate TPMIs that support a maximum transmit power of the UE 120 may be 11 bits in length, as described above in connection with FIG. 7. In example 800, the UE 120 may indicate, to the base station 110, that connections between transmit chains of the UE 120 and transmit antennas of the UE 120 are not reconfigurable. In this way, the base station 110 may be able to properly interpret the bitmap to derive the full set of TPMIs that support the maximum transmit power.

As indicated above, FIG. 8 is provided as an example. Other examples may differ from what is described with regard to FIG. 8.

Figure 9:
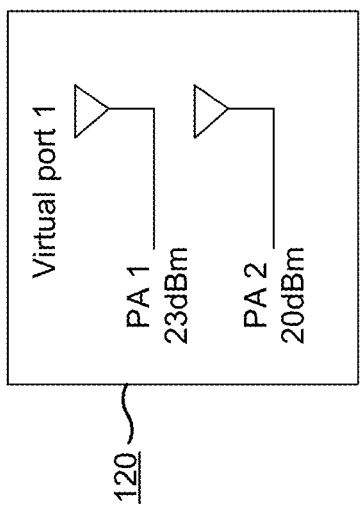

FIG. 9 is a diagram illustrating an example 900 of signaling and configuration of maximum transmit power using virtual ports, in accordance with various aspects of the present disclosure.

As shown in FIG. 9, in some aspects, a UE 120 may include two transmit antennas and two transmit chains. Each transmit chain may include a power amplifier. In example 900, connections between transmit chains (or power amplifiers) and antennas are not reconfigurable due to the hardware architecture of the UE 120, as described above in connection with FIG. 8. In this case, the bitmap used by the UE 120 to indicate TPMIs that support a maximum transmit power of the UE 120 may be 2 bits in length.

In an example 2-bit bitmap, a first bit of the bitmap indicates support for the maximum transmit power using only a first antenna of the UE 120 (shown as [1 0]), and a second bit of the bitmap indicates support for the maximum transmit power using only a second antenna of the UE 120 (shown as [0 1]). Using this combination of TPMIs (e.g., which may include a subset of the full set of TPMIs that support the maximum transmit power for the UE 120), the base station 110 may be able to derive the full set of TPMIs that support the maximum transmit power for the UE 120. For example, the full set of TPMIs may include [1 0] and [1 1], may include [0 1] and [1 1], or may include [1 0], [0 1], and [1 1]. In example 900, the UE 120 may indicate, to the base station 110, that connections between transmit chains of the UE 120 and transmit antennas of the UE 120 are not reconfigurable. In this way, the base station 110 may be able to properly interpret the bitmap to derive the full set of TPMIs that support the maximum transmit power.

In some aspects, the UE 120 may be required to support the maximum transmit power using TPMI [1 0] (e.g., using only the first antenna of the UE 120). For example, the UE 120 may be required to configure an initial bit of the TPMI to represent an antenna and/or transmit chain of the UE 120 that supports the maximum transmit power for a power class of the UE 120 (e.g., 23 dBm, in example 900). Thus, if the UE 120 has only two transmit antennas and is capable of combining antenna ports to transmit uplink communication using the maximum transmit power (e.g., using virtual ports), then the UE 120 may be required to support the maximum transmit power using only (or at least) the first antenna of the UE 120 (e.g., using TPMI [1 0]). In this case, if the UE 120 indicates to the base station 110 that the UE 120 includes only two transmit antennas and that the UE 120 is capable of combining antenna ports to transmit uplink communications using the maximum transmit power, then the UE 120 need not signal TPMIs that support the maximum transmit power because the base station 110 can infer that those TPMIs are [1 0] and [1 1].

As indicated above, FIG. 9 is provided as an example. Other examples may differ from what is described with regard to FIG. 9.

Figure 10:
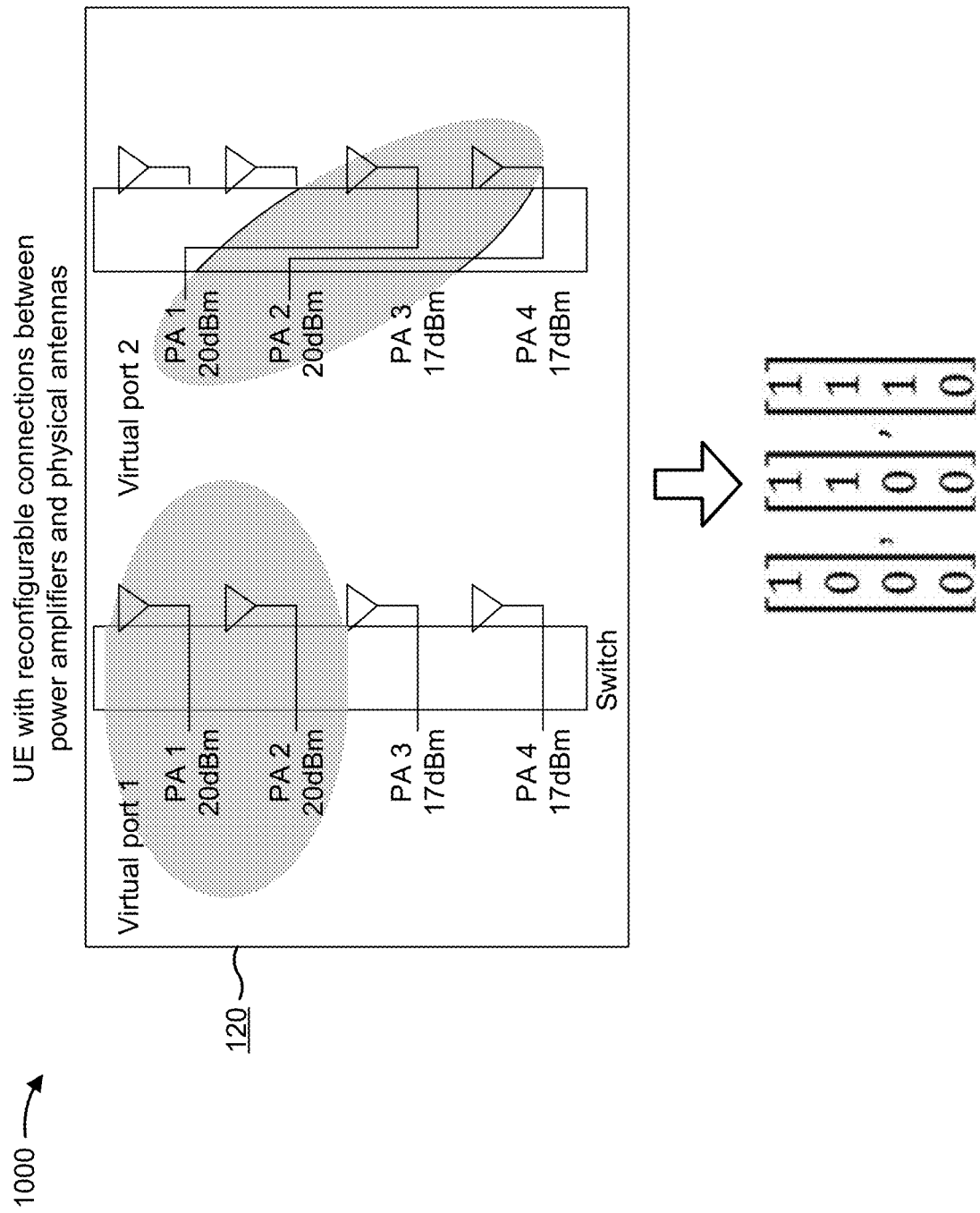

FIG. 10 is a diagram illustrating an example 1000 of signaling and configuration of maximum transmit power using virtual ports, in accordance with various aspects of the present disclosure.

As shown in FIG. 10, in some aspects, a UE 120 may include four transmit antennas and four transmit chains. Each transmit chain may include a power amplifier. In example 900, connections between transmit chains (or power amplifiers) and antennas are reconfigurable due to the hardware architecture of the UE 120. For example, a power amplifier of a transmit chain may have a reconfigurable connection with an antenna (e.g., a switched connection, a wired connection with a switch, and/or the like), the transmit chain may include a switch that permits the transmit chain and/or the power amplifier to be connected to a different antenna, and/or the like. In this case, the bitmap used by the UE 120 to indicate TPMIs that support a maximum transmit power of the UE 120 may be 3 bits in length.

In an example 3-bit bitmap, a first bit of the bitmap indicates support for the maximum transmit power using a single antenna of the UE 120 (shown as [1 0 0 0]), a second bit of the bitmap indicates support for the maximum transmit power using exactly two antennas of the UE 120 (shown as [1 1 0 0]), and a third bit of the bitmap indicates support for the maximum transmit power using exactly three antennas of the UE (shown as [1 1 1 0]). Using this combination of TPMIs (e.g., which may include a subset of the full set of TPMIs that support the maximum transmit power for the UE 120), the base station 110 may be able to derive the full set of TPMIs that support the maximum transmit power for the UE 120. For example, if the UE 120 indicates support for the maximum transmit power using a single antenna of the UE 120 (e.g., TPMI [1 0 0 0]), then the full set of TPMIs may include at least TPMI [1 0 0 0], TPMI [0 1 0 0], TPMI [0 0 1 0], and TPMI [0 0 0 1], because the power amplifier that supports the maximum transmit power (e.g., a 23 dBm power amplifier, for a power class 3 UE) may be connected to any one of the four antennas of the UE 120. In example 1000, the UE 120 may indicate, to the base station 110, that connections between transmit chains of the UE 120 and transmit antennas of the UE 120 are reconfigurable. In this way, the base station 110 may be able to properly interpret the bitmap to derive the full set of TPMIs that support the maximum transmit power.

As indicated above, FIG. 10 is provided as an example. Other examples may differ from what is described with regard to FIG. 10.

Figure 11:
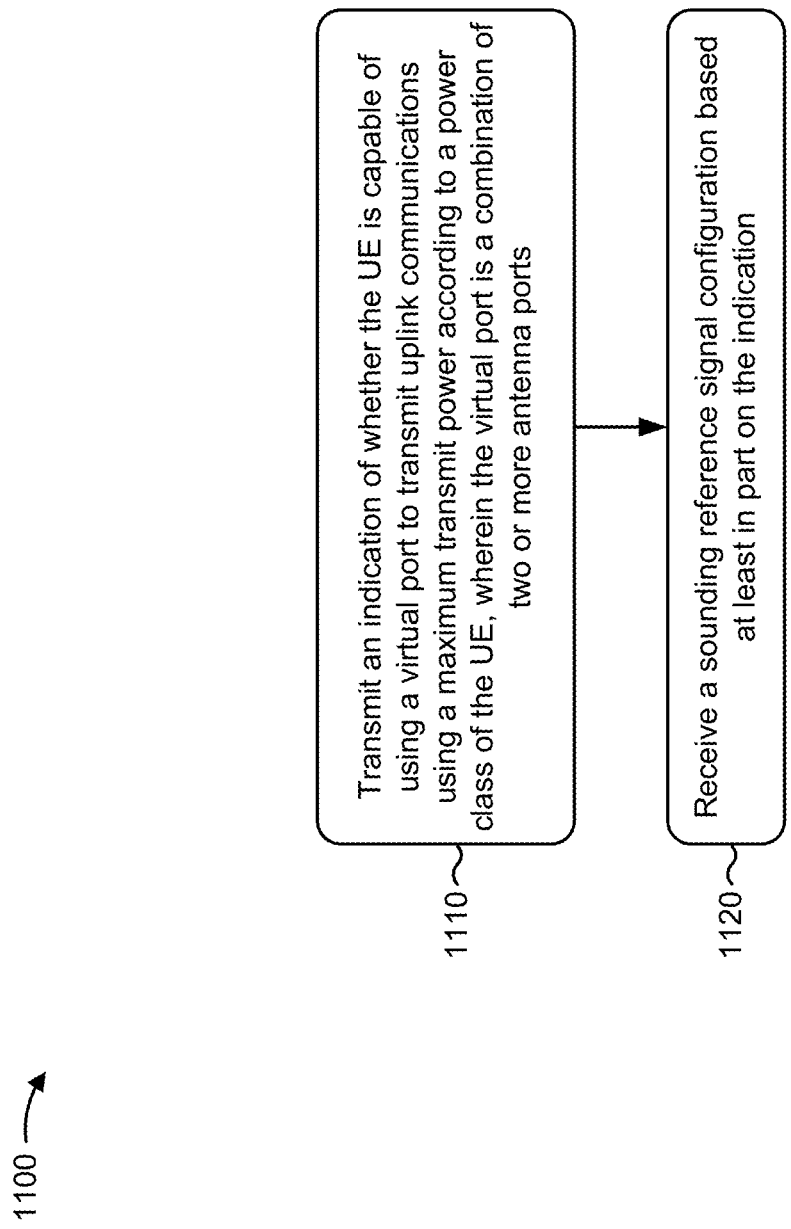
FIGS. 11 and 12 are diagrams illustrating example processes performed, for example, by a user equipment, in accordance with various aspects of the present disclosure.

FIG. 11 is a diagram illustrating an example process 1100 performed, for example, by a UE, in accordance with various aspects of the present disclosure. Example process 1100 is an example where a UE (e.g., UE 120 and/or the like) performs operations associated with signaling and configuration of maximum transmit power using virtual ports.

As shown in FIG. 11, in some aspects, process 1100 may include transmitting, to a base station, an indication of whether the UE is capable of using a virtual port to transmit uplink communications using a maximum transmit power according to a power class of the UE, wherein the virtual port is a combination of two or more antenna ports (block 1110). For example, the UE (e.g., using transmit processor 264, controller/processor 280, memory 282, and/or the like) may transmit, to a base station, an indication of whether the UE is capable of using a virtual port to transmit uplink communications using a maximum transmit power according to a power class of the UE, as described above. In some aspects, the virtual port is a combination of two or more antenna ports.

As further shown in FIG. 11, in some aspects, process 1100 may include receiving, from the base station, a sounding reference signal configuration based at least in part on the indication (block 1120). For example, the UE (e.g., using receive processor 258, controller/processor 280, memory 282, and/or the like) may receive, from the base station, a sounding reference signal configuration based at least in part on the indication, as described above.

Process 1100 may include additional aspects, such as any single aspect or any combination of aspects described below and/or in connection with one or more other processes described elsewhere herein.

In a first aspect, the indication of whether the UE is capable of using a virtual port to transmit uplink communications using the maximum transmit power is transmitted if the UE is not capable of supporting the maximum transmit power by setting a power scaling factor to one for all precoders supported by the UE.

In a second aspect, alone or in combination with the first aspect the indication further indicates whether the UE is capable of supporting the maximum transmit power using precoders that span across non-coherent antenna ports.

In a third aspect, alone or in combination with one or more of the first and second aspects, the indication includes two bits, and a first value of the two bits indicates that the UE is capable of supporting the maximum transmit power using precoders that span across non-coherent antenna ports and not using a virtual port, a second value of the two bits indicates that the UE is capable of supporting the maximum transmit power using a virtual port and not using precoders that span across non-coherent antenna ports, a third value of the two bits indicates that the UE is capable of supporting the maximum transmit power using both precoders that span across non-coherent antenna ports and using a virtual port, and a fourth value of the two bits indicates that the UE is not capable of supporting the maximum transmit power using precoders that span across non-coherent antenna ports and is not capable of supporting the maximum transmit power using a virtual port.

In a fourth aspect, alone or in combination with one or more of the first through third aspects, the indication is per band-band combination supported by the UE, and/or that indication is transmitted for every band in each band-band combination supported by the UE.

In a fifth aspect, alone or in combination with one or more of the first through fourth aspects, the indication further indicates a number of virtual ports that the UE is capable of using to transmit uplink communications using the maximum transmit power.

In a sixth aspect, alone or in combination with one or more of the first through fifth aspects, a first value of the indication indicates that the UE is not capable of using a virtual port to transmit uplink communications using the maximum transmit power, and a second value of the indication indicates that the UE is capable of using a single virtual port to transmit uplink communications using the maximum transmit power.

In a seventh aspect, alone or in combination with one or more of the first through sixth aspects, the indication is a single bit when the UE includes two transmit chains.

In an eighth aspect, alone or in combination with one or more of the first through seventh aspects, a first value of the indication indicates that the UE is not capable of using a virtual port to transmit uplink communications using the maximum transmit power, a second value of the indication indicates that the UE is capable of using at least one virtual port to transmit uplink communications using the maximum transmit power, and a third value of the indication indicates that the UE is capable of using two virtual ports to transmit simultaneous uplink communications using the maximum transmit power on each of the two virtual ports.

In a ninth aspect, alone or in combination with one or more of the first through eighth aspects, the indication is two bits when the UE includes four transmit chains.

In a tenth aspect, alone or in combination with one or more of the first through ninth aspects, the indication is transmitted in a field of a capability report, and the field is empty or excluded from the capability report when each transmit chain of the UE includes a power amplifier capable of supporting the maximum transmit power.

In an eleventh aspect, alone or in combination with one or more of the first through tenth aspects, at least a number or a type of sounding reference signal resources configured for a sounding reference signal resource set indicated in the sounding reference signal configuration is based at least in part on the indication.

In a twelfth aspect, alone or in combination with one or more of the first through eleventh aspects, the two or more antenna ports are combined using at least one of precoding or cyclic delay diversity to synthesize the virtual port.

In a thirteenth aspect, alone or in combination with one or more of the first through twelfth aspects, the two or more antenna ports are non-coherent or partially coherent.

In a fourteenth aspect, alone or in combination with one or more of the first through thirteenth aspects, process 1100 may include transmitting an uplink communication (e.g., an SRS, a data communication, and/or the like) based at least in part on the SRS configuration.

In a fifteenth aspect, alone or in combination with one or more of the first through fourteenth aspects, process 1100 may include transmitting an uplink communication using the virtual port.

In a sixteenth aspect, alone or in combination with one or more of the first through fifteenth aspects, the uplink communication is transmitted using the maximum transmit power.

Although FIG. 11 shows example blocks of process 1100, in some aspects, process 1100 may include additional blocks, fewer blocks, different blocks, or differently arranged blocks than those depicted in FIG. 11. Additionally, or alternatively, two or more of the blocks of process 1100 may be performed in parallel.

Figure 12:
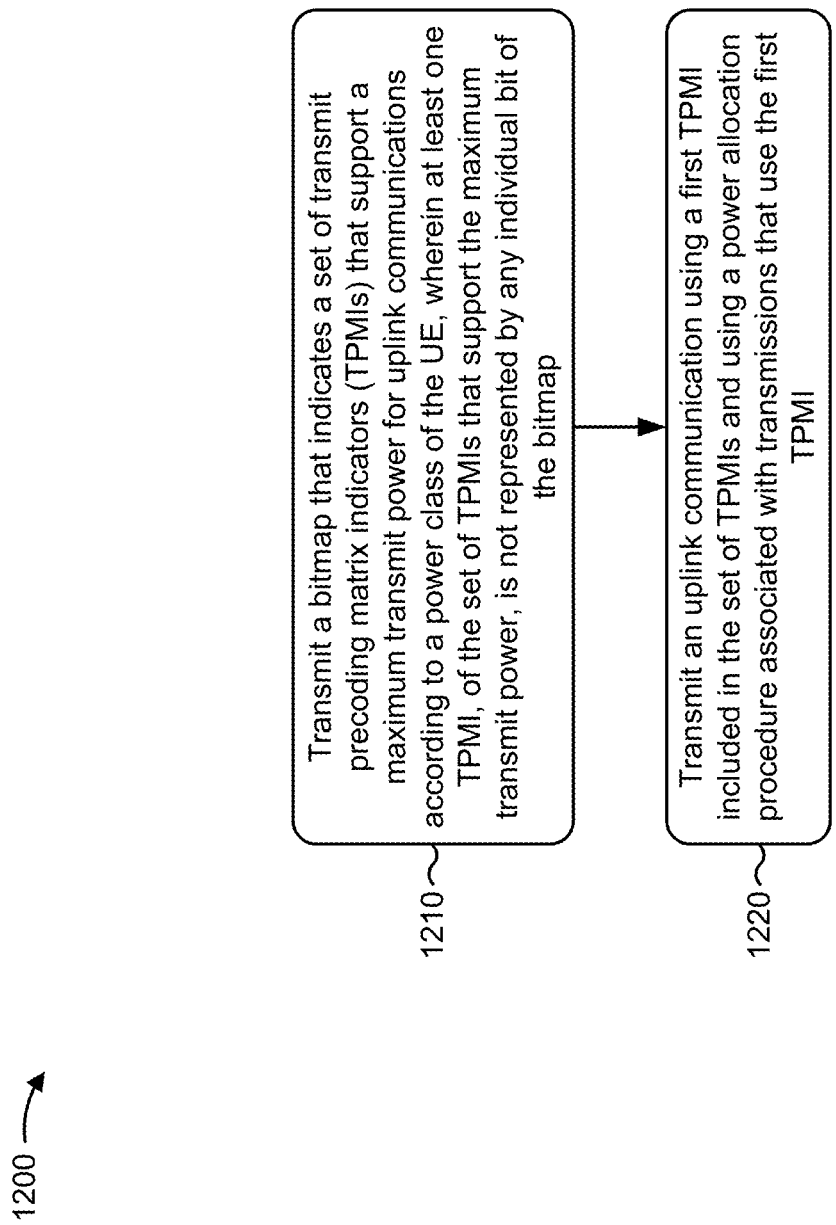

FIG. 12 is a diagram illustrating an example process 1200 performed, for example, by a UE, in accordance with various aspects of the present disclosure. Example process 1200 is an example where a UE (e.g., UE 120 and/or the like) performs operations associated with signaling and configuration of maximum transmit power using virtual ports.

As shown in FIG. 12, in some aspects, process 1200 may include transmitting, to a base station, a bitmap that indicates a set of TPMIs that support a maximum transmit power for uplink communications according to a power class of the UE, wherein at least one TPMI, of the set of TPMIs that support the maximum transmit power, is not represented by any individual bit of the bitmap (block 1210). For example, the UE (e.g., using transmit processor 264, controller/processor 280, memory 282, and/or the like) may transmit, to a base station, a bitmap that indicates a set of TPMIs that support a maximum transmit power for uplink communications according to a power class of the UE, as described above. In some aspects, at least one TPMI, of the set of TPMIs that support the maximum transmit power, is not represented by any individual bit of the bitmap.

As further shown in FIG. 12, in some aspects, process 1200 may include transmitting an uplink communication using a first TPMI included in the set of TPMIs and using a power allocation procedure associated with transmissions that use the first TPMI (block 1220). For example, the UE (e.g., using transmit processor 264, controller/processor 280, memory 282, and/or the like) may transmit an uplink communication using a first TPMI included in the set of TPMIs and using a power allocation procedure associated with transmissions that use the first TPMI, as described above.

Process 1200 may include additional aspects, such as any single aspect or any combination of aspects described below and/or in connection with one or more other processes described elsewhere herein.

In a first aspect, the set of TPMIs that support the maximum transmit power includes more TPMIs than a number of TPMIs explicitly indicated by the UE, using the bitmap, as supporting the maximum transmit power.

In a second aspect, alone or in combination with the first aspect, the at least one TPMI includes a TPMI in which all transmit chains of the UE are used.

In a third aspect, alone or in combination with one or more of the first and second aspects, each bit in the bitmap corresponds to a single-layer TPMI.

In a fourth aspect, alone or in combination with one or more of the first through third aspects, the at least one TPMI includes a multi-layer TPMI.

In a fifth aspect, alone or in combination with one or more of the first through fourth aspects, the bitmap is 11 bits in length when the UE includes four transmit chains and when corresponding connections between transmit chains and transmit antennas are not reconfigurable.

In a sixth aspect, alone or in combination with one or more of the first through fifth aspects, a first bit of the bitmap indicates support for the maximum transmit power using only a first transmit chain of the UE, a second bit of the bitmap indicates support for the maximum transmit power using only a second transmit chain of the UE, a third bit of the bitmap indicates support for the maximum transmit power using only a third transmit chain of the UE, a fourth bit of the bitmap indicates support for the maximum transmit power using only a fourth transmit chain of the UE, a fifth bit of the bitmap indicates support for the maximum transmit power using only the first transmit chain and the third transmit chain, a sixth bit of the bitmap indicates support for the maximum transmit power using only the second transmit chain and the fourth transmit chain, a seventh bit of the bitmap indicates support for the maximum transmit power using only the first transmit chain and the second transmit chain, an eighth bit of the bitmap indicates support for the maximum transmit power using only the first transmit chain and the fourth transmit chain, a ninth bit of the bitmap indicates support for the maximum transmit power using only the second transmit chain and the third transmit chain, a tenth bit of the bitmap indicates support for the maximum transmit power using only the third transmit chain and the fourth transmit chain, and an eleventh bit of the bitmap indicates support for the maximum transmit power using only the first transmit chain, the second transmit chain, and the third transmit chain.

In a seventh aspect, alone or in combination with one or more of the first through sixth aspects, the set of TPMIs indicated by the UE includes fewer than all TPMIs that support the maximum transmit power for the UE.

In an eighth aspect, alone or in combination with one or more of the first through seventh aspects, the bitmap is 2 bits in length when the UE includes two transmit chains and when corresponding connections between transmit chains and transmit antennas are not reconfigurable.

In a ninth aspect, alone or in combination with one or more of the first through eighth aspects, a first bit of the bitmap indicates support for the maximum transmit power using only a first transmit chain of the UE, and a second bit of the bitmap indicates support for the maximum transmit power using only a second transmit chain of the UE.

In a tenth aspect, alone or in combination with one or more of the first through ninth aspects, the UE is required to support the maximum transmit power using only a first transmit chain of the UE if the UE has only two transmit chains and is capable of combining antenna ports to transmit uplink communications using the maximum transmit power.

In an eleventh aspect, alone or in combination with one or more of the first through tenth aspects, the bitmap is 3 bits in length when the UE includes four transmit chains and when corresponding connections between transmit chains and transmit antennas are reconfigurable.

In a twelfth aspect, alone or in combination with one or more of the first through eleventh aspects, a first bit of the bitmap indicates support for the maximum transmit power using a single transmit chain of the UE, a second bit of the bitmap indicates support for the maximum transmit power using two transmit chains of the UE, and a third bit of the bitmap indicates support for the maximum transmit power using three transmit chains of the UE.

In a thirteenth aspect, alone or in combination with one or more of the first through twelfth aspects, process 1200 includes transmitting, to the base station, an indication of whether connections between transmit chains of the UE and transmit antennas of the UE are reconfigurable.

In a fourteenth aspect, alone or in combination with one or more of the first through thirteenth aspects, the power allocation procedure includes refraining from performing power scaling when transmitting using the first TPMI or adopting a different power allocation procedure when transmitting using the first TPMI as compared to transmitting using a TPMI not included in the set of TPMIs.

In a fifteenth aspect, alone or in combination with one or more of the first through fourteenth aspects, process 1200 includes receiving an instruction to transmit using the maximum transmit power and a TPMI included in the set of TPMIs.

Although FIG. 12 shows example blocks of process 1200, in some aspects, process 1200 may include additional blocks, fewer blocks, different blocks, or differently arranged blocks than those depicted in FIG. 12. Additionally, or alternatively, two or more of the blocks of process 1200 may be performed in parallel.

Figure 13:
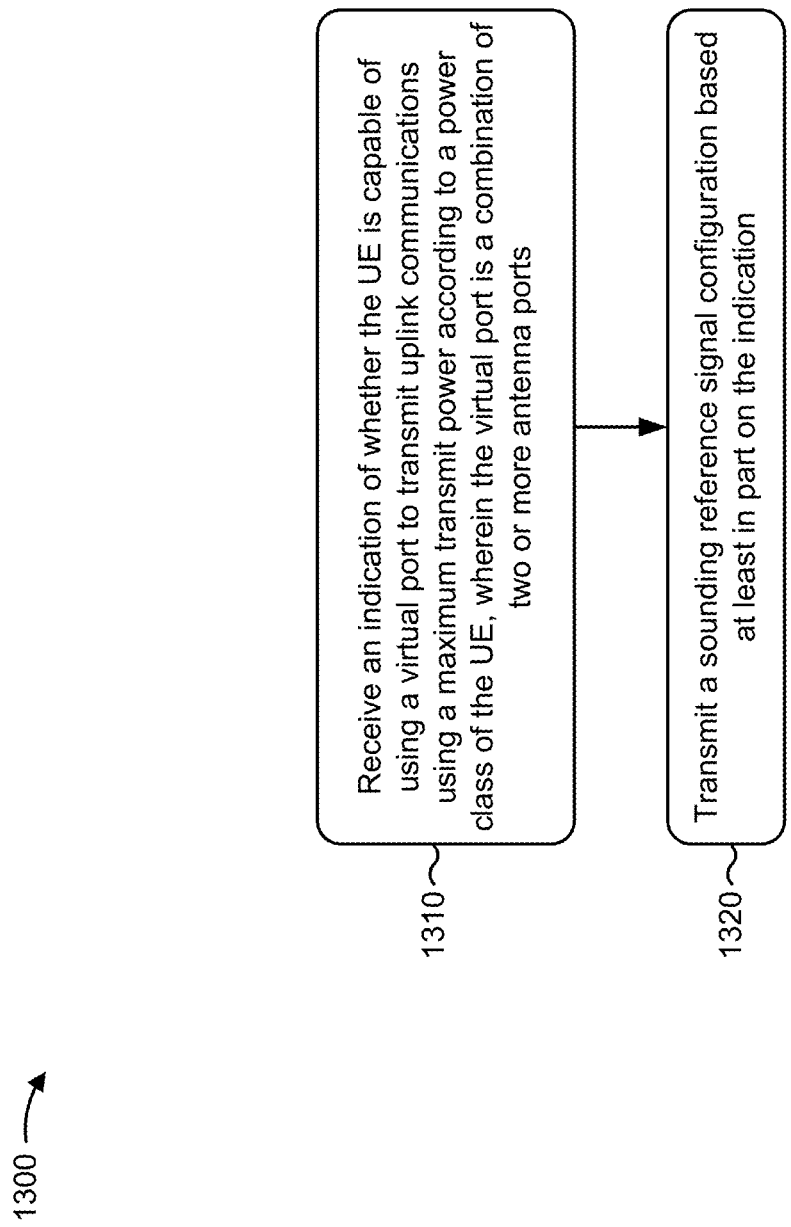
FIGS. 13 and 14 are diagrams illustrating example processes performed, for example, by a base station, in accordance with various aspects of the present disclosure.

FIG. 13 is a diagram illustrating an example process 1300 performed, for example, by a base station, in accordance with various aspects of the present disclosure. Example process 1300 is an example where a base station (e.g., base station 110 and/or the like) performs operations associated with signaling and configuration of maximum transmit power using virtual ports.

As shown in FIG. 13, in some aspects, process 1300 may include receiving, from a UE, an indication of whether the UE is capable of using a virtual port to transmit uplink communications using a maximum transmit power according to a power class of the UE, wherein the virtual port is a combination of two or more antenna ports (block 1310). For example, the base station (e.g., using receive processor 238, controller/processor 240, memory 242, and/or the like) may receive, from a UE, an indication of whether the UE is capable of using a virtual port to transmit uplink communications using a maximum transmit power according to a power class of the UE, as described above. In some aspects, the virtual port is a combination of two or more antenna ports.

As further shown in FIG. 13, in some aspects, process 1300 may include transmitting, to the UE, a sounding reference signal configuration based at least in part on the indication (block 1320). For example, the base station (e.g., using transmit processor 220, controller/processor 240, memory 242, and/or the like) may transmit, to the UE, a sounding reference signal configuration based at least in part on the indication, as described above.

Process 1300 may include additional aspects, such as any single aspect or any combination of aspects described below and/or in connection with one or more other processes described elsewhere herein.

In a first aspect, the indication of whether the UE is capable of using a virtual port to transmit uplink communications using the maximum transmit power is received if the UE is not capable of supporting the maximum transmit power by setting a power scaling factor to one for all precoders supported by the UE.

In a second aspect, alone or in combination with the first aspect the indication further indicates whether the UE is capable of supporting the maximum transmit power using precoders that span across non-coherent antenna ports.

In a third aspect, alone or in combination with one or more of the first and second aspects, the indication includes two bits, and a first value of the two bits indicates that the UE is capable of supporting the maximum transmit power using precoders that span across non-coherent antenna ports and not using a virtual port, a second value of the two bits indicates that the UE is capable of supporting the maximum transmit power using a virtual port and not using precoders that span across non-coherent antenna ports, a third value of the two bits indicates that the UE is capable of supporting the maximum transmit power using both precoders that span across non-coherent antenna ports and using a virtual port, and a fourth value of the two bits indicates that the UE is not capable of supporting the maximum transmit power using precoders that span across non-coherent antenna ports and is not capable of supporting the maximum transmit power using a virtual port.

In a fourth aspect, alone or in combination with one or more of the first through third aspects, the indication is per band-band combination supported by the UE.

In a fifth aspect, alone or in combination with one or more of the first through fourth aspects, process 1300 includes receiving an indication of a number of virtual ports that the UE is capable of using to transmit uplink communications using the maximum transmit power.

In a sixth aspect, alone or in combination with one or more of the first through fifth aspects, a first value of the indication indicates that the UE is not capable of using a virtual port to transmit uplink communications using the maximum transmit power, and a second value of the indication indicates that the UE is capable of using a single virtual port to transmit uplink communications using the maximum transmit power.

In a seventh aspect, alone or in combination with one or more of the first through sixth aspects, the indication is a single bit when the UE includes two transmit chains.

In an eighth aspect, alone or in combination with one or more of the first through seventh aspects, a first value of the indication indicates that the UE is not capable of using a virtual port to transmit uplink communications using the maximum transmit power, a second value of the indication indicates that the UE is capable of using at least one virtual port to transmit uplink communications using the maximum transmit power, and a third value of the indication indicates that the UE is capable of using two virtual ports to transmit simultaneous uplink communications using the maximum transmit power on each of the two virtual ports.

In a ninth aspect, alone or in combination with one or more of the first through eighth aspects, the indication is two bits when the UE includes four transmit chains.

In a tenth aspect, alone or in combination with one or more of the first through ninth aspects, the indication is received in a field of a capability report, and the field is empty or excluded from the capability report when each transmit chain of the UE includes a power amplifier capable of supporting the maximum transmit power.

In an eleventh aspect, alone or in combination with one or more of the first through tenth aspects, at least a number or a type of sounding reference signal resources configured for a sounding reference signal resource set indicated in the sounding reference signal configuration is based at least in part on the indication.

In a twelfth aspect, alone or in combination with one or more of the first through eleventh aspects, the two or more antenna ports are combined using at least one of precoding or cyclic delay diversity to synthesize the virtual port.

In a thirteenth aspect, alone or in combination with one or more of the first through twelfth aspects, the two or more antenna ports are non-coherent or partially coherent.

Although FIG. 13 shows example blocks of process 1300, in some aspects, process 1300 may include additional blocks, fewer blocks, different blocks, or differently arranged blocks than those depicted in FIG. 13. Additionally, or alternatively, two or more of the blocks of process 1300 may be performed in parallel.

Figure 14:
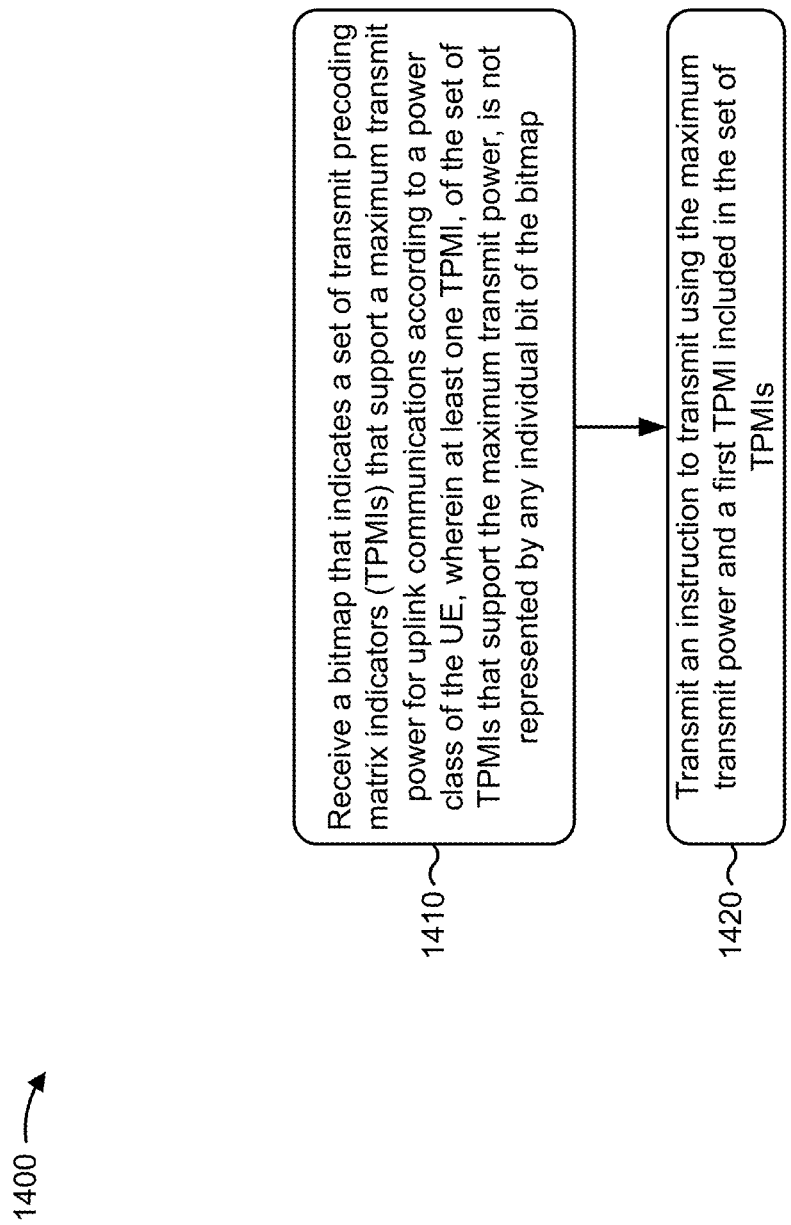

FIG. 14 is a diagram illustrating an example process 1400 performed, for example, by a base station, in accordance with various aspects of the present disclosure. Example process 1400 is an example where a base station (e.g., base station 110 and/or the like) performs operations associated with signaling and configuration of maximum transmit power using virtual ports.

As shown in FIG. 14, in some aspects, process 1400 may include receiving, from a UE, a bitmap that indicates a set of TPMIs that support a maximum transmit power for uplink communications according to a power class of the UE, wherein at least one TPMI, of the set of TPMIs that support the maximum transmit power, is not represented by any individual bit of the bitmap (block 1410). For example, the base station (e.g., using receive processor 238, controller/processor 240, memory 242, and/or the like) may receive, from a UE, a bitmap that indicates a set of TPMIs that support a maximum transmit power for uplink communications according to a power class of the UE, as described above. In some aspects, at least one TPMI, of the set of TPMIs that support the maximum transmit power, is not represented by any individual bit of the bitmap.

As further shown in FIG. 14, in some aspects, process 1400 may include transmitting, to the UE, an instruction to transmit using the maximum transmit power and a TPMI included in the set of TPMIs (block 1420). For example, the base station (e.g., using transmit processor 220, controller/processor 240, memory 242, and/or the like) may transmit, to the UE, an instruction to transmit using the maximum transmit power and a TPMI included in the set of TPMIs, as described above.

Process 1400 may include additional aspects, such as any single aspect or any combination of aspects described below and/or in connection with one or more other processes described elsewhere herein.

In a first aspect, the set of TPMIs that support the maximum transmit power includes more TPMIs than a number of TPMIs explicitly indicated by the UE, using the bitmap, as supporting the maximum transmit power.

In a second aspect, alone or in combination with the first aspect, the at least one TPMI includes a TPMI in which all transmit chains of the UE are used.

In a third aspect, alone or in combination with one or more of the first and second aspects, each bit in the bitmap corresponds to a single-layer TPMI.

In a fourth aspect, alone or in combination with one or more of the first through third aspects, the at least one TPMI includes a multi-layer TPMI.

In a fifth aspect, alone or in combination with one or more of the first through fourth aspects, the bitmap is 11 bits in length when the UE includes four transmit chains and when corresponding connections between transmit chains and transmit antennas are not reconfigurable.

In a sixth aspect, alone or in combination with one or more of the first through fifth aspects, a first bit of the bitmap indicates support for the maximum transmit power using only a first transmit chain of the UE, a second bit of the bitmap indicates support for the maximum transmit power using only a second transmit chain of the UE, a third bit of the bitmap indicates support for the maximum transmit power using only a third transmit chain of the UE, a fourth bit of the bitmap indicates support for the maximum transmit power using only a fourth transmit chain of the UE, a fifth bit of the bitmap indicates support for the maximum transmit power using only the first transmit chain and the third transmit chain, a sixth bit of the bitmap indicates support for the maximum transmit power using only the second transmit chain and the fourth transmit chain, a seventh bit of the bitmap indicates support for the maximum transmit power using only the first transmit chain and the second transmit chain, an eighth bit of the bitmap indicates support for the maximum transmit power using only the first transmit chain and the fourth transmit chain, a ninth bit of the bitmap indicates support for the maximum transmit power using only the second transmit chain and the third transmit chain, a tenth bit of the bitmap indicates support for the maximum transmit power using only the third transmit chain and the fourth transmit chain, and an eleventh bit of the bitmap indicates support for the maximum transmit power using only the first transmit chain, the second transmit chain, and the third transmit chain.

In a seventh aspect, alone or in combination with one or more of the first through sixth aspects, the set of TPMIs indicated by the UE includes fewer than all TPMIs that support the maximum transmit power for the UE.

In an eighth aspect, alone or in combination with one or more of the first through seventh aspects, the bitmap is 2 bits in length when the UE includes two transmit chains and when corresponding connections between transmit chains and transmit antennas are not reconfigurable.

In a ninth aspect, alone or in combination with one or more of the first through eighth aspects, a first bit of the bitmap indicates support for the maximum transmit power using only a first transmit chain of the UE, and a second bit of the bitmap indicates support for the maximum transmit power using only a second transmit chain of the UE.

In a tenth aspect, alone or in combination with one or more of the first through ninth aspects, the UE is required to support the maximum transmit power using only a first transmit chain of the UE if the UE has only two transmit chains and is capable of combining antenna ports to transmit uplink communications using the maximum transmit power.

In an eleventh aspect, alone or in combination with one or more of the first through tenth aspects, the bitmap is 3 bits in length when the UE includes four transmit chains and when corresponding connections between transmit chains and transmit antennas are reconfigurable.

In a twelfth aspect, alone or in combination with one or more of the first through eleventh aspects, a first bit of the bitmap indicates support for the maximum transmit power using a single transmit chain of the UE, a second bit of the bitmap indicates support for the maximum transmit power using two transmit chains of the UE, and a third bit of the bitmap indicates support for the maximum transmit power using three transmit chains of the UE.

In a thirteenth aspect, alone or in combination with one or more of the first through twelfth aspects, process 1400 includes receiving, from the UE, an indication of whether connections between transmit chains of the UE and transmit antennas of the UE are reconfigurable.

Although FIG. 14 shows example blocks of process 1400, in some aspects, process 1400 may include additional blocks, fewer blocks, different blocks, or differently arranged blocks than those depicted in FIG. 14. Additionally, or alternatively, two or more of the blocks of process 1400 may be performed in parallel.

The foregoing disclosure provides illustration and description, but is not intended to be exhaustive or to limit the aspects to the precise form disclosed. Modifications and variations may be made in light of the above disclosure or may be acquired from practice of the aspects.

As used herein, the term "component" is intended to be broadly construed as hardware, firmware, and/or a combination of hardware and software. As used herein, a processor is implemented in hardware, firmware, and/or a combination of hardware and software.

As used herein, satisfying a threshold may, depending on the context, refer to a value being greater than the threshold, greater than or equal to the threshold, less than the threshold, less than or equal to the threshold, equal to the threshold, not equal to the threshold, and/or the like.

It will be apparent that systems and/or methods described herein may be implemented in different forms of hardware, firmware, and/or a combination of hardware and software. The actual specialized control hardware or software code used to implement these systems and/or methods is not limiting of the aspects. Thus, the operation and behavior of the systems and/or methods were described herein without reference to specific software code—it being understood that software and hardware can be designed to implement the systems and/or methods based, at least in part, on the description herein.

Even though particular combinations of features are recited in the claims and/or disclosed in the specification, these combinations are not intended to limit the disclosure of various aspects. In fact, many of these features may be combined in ways not specifically recited in the claims and/or disclosed in the specification. Although each dependent claim listed below may directly depend on only one claim, the disclosure of various aspects includes each dependent claim in combination with every other claim in the claim set. A phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

No element, act, or instruction used herein should be construed as critical or essential unless explicitly described as such. Also, as used herein, the articles "a" and "an" are intended to include one or more items, and may be used interchangeably with "one or more." Furthermore, as used herein, the terms "set" and "group" are intended to include one or more items (e.g., related items, unrelated items, a combination of related and unrelated items, and/or the like), and may be used interchangeably with "one or more." Where only one item is intended, the phrase "only one" or similar language is used. Also, as used herein, the terms "has," "have," "having," and/or the like are intended to be open-ended terms. Further, the phrase "based on" is intended to mean "based, at least in part, on" unless explicitly stated otherwise.

What is claimed is:

1. A method of wireless communication performed by a user equipment (UE), comprising:
   transmitting, to network node, an indication of whether the UE is capable of transmitting uplink communications using a maximum transmit power according to a power class of the UE; and
   receiving, from the network node, a sounding reference signal configuration based at least in part on the indication,
   wherein at least one of:
      the indication is transmitted for every band in each band-band combination supported by the UE, or
      at least a number or a type of sounding reference signal resources configured for a sounding reference signal resource set indicated in the sounding reference signal configuration is based at least in part on the indication.

2. The method of claim 1, wherein the indication further indicates a number of ports that the UE is capable of using to transmit uplink communications using the maximum transmit power.

3. The method of claim 1, wherein the indication is transmitted for every band in each band-band combination supported by the UE.

4. The method of claim 1, wherein the at least the number or the type of sounding reference signal resources configured for the sounding reference signal resource set indicated in the sounding reference signal configuration is based at least in part on the indication.

5. The method of claim 1, wherein the indication of whether the UE is capable of transmitting uplink communications using the maximum transmit power is transmitted if the UE is not capable of supporting the maximum transmit power by setting a power scaling factor to one for all precoders supported by the UE.

6. The method of claim 1, wherein a first value of the indication indicates that the UE is not capable of transmitting uplink communications using the maximum transmit power, and a second value of the indication indicates that the UE is capable of transmitting uplink communications using the maximum transmit power.

7. The method of claim 1, wherein the indication is a single bit when the UE includes two transmit chains.

8. The method of claim 1, wherein a first value of the indication indicates that the UE is not capable of transmitting uplink communications using the maximum transmit power, a second value of the indication indicates that the UE is capable of transmitting uplink communications using the maximum transmit power, and a third value of the indication indicates that the UE is capable of transmitting simultaneous uplink communications using the maximum transmit power.

9. The method of claim 1, wherein the indication is two bits when the UE includes four transmit chains.

10. The method of claim 1, wherein the indication is transmitted in a field of a capability report, and wherein the field is empty or excluded from the capability report when each transmit chain of the UE includes a power amplifier capable of supporting the maximum transmit power.

11. A method of wireless communication performed by a network node, comprising:
receiving, from a user equipment (UE), an indication of whether the UE is capable of transmitting uplink communications using a maximum transmit power according to a power class of the UE; and
transmitting, to the UE, a sounding reference signal configuration based at least in part on the indication,
wherein at least one of:
the indication is transmitted for every band in each band-band combination supported by the UE, or
at least a number or a type of sounding reference signal resources configured for a sounding reference signal resource set indicated in the sounding reference signal configuration is based at least in part on the indication.

12. The method of claim 11, further comprising receiving an indication of a number of ports that the UE is capable of using to transmit uplink communications using the maximum transmit power.

13. The method of claim 11, wherein the indication is received for every band in each band-band combination supported by the UE.

14. The method of claim 11, wherein the at least the number or the type of sounding reference signal resources configured for the sounding reference signal resource set indicated in the sounding reference signal configuration is based at least in part on the indication.

15. A user equipment (UE) for wireless communication, comprising:
a memory; and
one or more processors coupled to the memory, the one or more processors configured to:
transmit, to a network node, an indication of whether the UE is capable of transmitting uplink communications using a maximum transmit power according to a power class of the UE; and
receive, from the network node, a sounding reference signal configuration based at least in part on the indication,
wherein at least one of:
the indication is transmitted for every band in each band-band combination supported by the UE, or
at least a number or a type of sounding reference signal resources configured for a sounding reference signal resource set indicated in the sounding reference signal configuration is based at least in part on the indication.

16. The UE of claim 15, wherein the indication indicates a number of ports that the UE is capable of using to transmit uplink communications using the maximum transmit power.

17. The UE of claim 15, wherein the indication is transmitted for every band in each band-band combination supported by the UE.

18. The UE of claim 15, wherein the at least the number or the type of sounding reference signal resources configured for the sounding reference signal resource set indicated in the sounding reference signal configuration is based at least in part on the indication.

19. The UE of claim 15, wherein the indication of whether the UE is capable of transmitting uplink communications using the maximum transmit power is transmitted if the UE is not capable of supporting the maximum transmit power by setting a power scaling factor to one for all precoders supported by the UE.

20. The UE of claim 15, wherein a first value of the indication indicates that the UE is not capable of transmitting uplink communications using the maximum transmit power, and a second value of the indication indicates that the UE is capable of transmitting uplink communications using the maximum transmit power.

21. The UE of claim 15, wherein the indication is a single bit when the UE includes two transmit chains or the indication is two bits when the UE includes four transmit chains.

22. A network node for wireless communication, comprising:
a memory; and
one or more processors coupled to the memory, the one or more processors configured to:
receive, from a user equipment (UE), an indication of whether the UE is capable of transmitting uplink communications using a maximum transmit power according to a power class of the UE; and
transmit, to the UE, a sounding reference signal configuration based at least in part on the indication,
wherein at least one of:
the indication is transmitted for every band in each band-band combination supported by the UE, or
at least a number or a type of sounding reference signal resources configured for a sounding reference signal resource set indicated in the sounding reference signal configuration is based at least in part on the indication.

23. The network node of claim 22, wherein the indication indicates a number of ports that the UE is capable of using to transmit uplink communications using the maximum transmit power.

24. The network node of claim 22, wherein the indication is transmitted for every band in each band-band combination supported by the UE.

25. The network node of claim 22, wherein the at least the number or the type of sounding reference signal resources configured for the sounding reference signal resource set indicated in the sounding reference signal configuration is based at least in part on the indication.

26. The network node of claim 22, wherein the indication of whether the UE is capable of transmitting uplink communications using the maximum transmit power is transmitted if the UE is not capable of supporting the maximum transmit power by setting a power scaling factor to one for all precoders supported by the UE.

27. The network node of claim 22, wherein a first value of the indication indicates that the UE is not capable of transmitting uplink communications using the maximum transmit power, and a second value of the indication indicates that the UE is capable of transmitting uplink communications using the maximum transmit power.

28. The network node of claim 22, wherein the indication is a single bit when the UE includes two transmit chains or the indication is two bits when the UE includes four transmit chains.

29. A non-transitory computer-readable medium storing a set of instructions for wireless communication, the set of instructions comprising:
one or more instructions that, when executed by one or more processors of a user equipment (UE), cause the UE to:
transmit, to a network node, an indication of whether the UE is capable of transmitting uplink communications using a maximum transmit power according to a power class of the UE; and
receive, from the network node, a sounding reference signal configuration based at least in part on the indication,
wherein at least one of:
the indication is transmitted for every band in each band-band combination supported by the UE, or
at least a number or a type of sounding reference signal resources configured for a sounding reference signal resource set indicated in the sounding reference signal configuration is based at least in part on the indication.

30. The non-transitory computer-readable medium of claim 29, wherein the indication indicates a number of ports that the UE is capable of using to transmit uplink communications using the maximum transmit power.

31. The non-transitory computer-readable medium of claim 29, wherein the indication is transmitted for every band in each band-band combination supported by the UE.

32. The non-transitory computer-readable medium of claim 29, wherein the at least the number or the type of sounding reference signal resources configured for the sounding reference signal resource set indicated in the sounding reference signal configuration is based at least in part on the indication.

33. The non-transitory computer-readable medium of claim 29, wherein the indication of whether the UE is capable of transmitting uplink communications using the maximum transmit power is transmitted if the UE is not capable of supporting the maximum transmit power by setting a power scaling factor to one for all precoders supported by the UE.

34. The non-transitory computer-readable medium of claim 29, wherein a first value of the indication indicates that the UE is not capable of transmitting uplink communications using the maximum transmit power, and a second value of the indication indicates that the UE is capable of transmitting uplink communications using the maximum transmit power.

35. The non-transitory computer-readable medium of claim 29, wherein the indication is a single bit when the UE includes two transmit chains or the indication is two bits when the UE includes four transmit chains.

36. An apparatus for wireless communication, comprising:
means for transmitting, to a network node, an indication of whether the apparatus is capable of transmitting uplink communications using a maximum transmit power according to a power class of the apparatus; and
means for receiving, from the network node, a sounding reference signal configuration based at least in part on the indication,
wherein at least one of:
the indication is transmitted for every band in each band-band combination supported by the apparatus, or
at least a number or a type of sounding reference signal resources configured for a sounding reference signal resource set indicated in the sounding reference signal configuration is based at least in part on the indication.

37. The apparatus of claim 36, wherein the indication indicates a number of ports that the apparatus is capable of using to transmit uplink communications using the maximum transmit power.

38. The apparatus of claim 36, wherein the indication of whether the apparatus is capable of transmitting uplink communications using the maximum transmit power is transmitted if the apparatus is not capable of supporting the maximum transmit power by setting a power scaling factor to one for all precoders supported by the apparatus.

39. The apparatus of claim 36, wherein a first value of the indication indicates that the apparatus is not capable of transmitting uplink communications using the maximum transmit power, and a second value of the indication indicates that the apparatus is capable of transmitting uplink communications using the maximum transmit power.

40. The apparatus of claim 36, wherein the indication is a single bit when the apparatus includes two transmit chains or the indication is two bits when the apparatus includes four transmit chains.

* * * * *